US012720625B2

(12) United States Patent
Hong et al.

(10) Patent No.: US 12,720,625 B2
(45) Date of Patent: Aug. 25, 2026

(54) METHOD AND DEVICE FOR TRANSMITTING OR RECEIVING DATA IN DUAL CONNECTIVITY STATE

(71) Applicant: KT CORPORATION, Gyeonggi-do (KR)

(72) Inventors: Sung-pyo Hong, Seoul (KR); Woo-jin Choi, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 130 days.

(21) Appl. No.: 16/314,442

(22) PCT Filed: Jun. 29, 2017

(86) PCT No.: PCT/KR2017/006912

§ 371 (c)(1),
(2) Date: Dec. 30, 2018

(87) PCT Pub. No.: WO2018/004278

PCT Pub. Date: Jan. 4, 2018

(65) Prior Publication Data

US 2019/0159274 A1 May 23, 2019

(30) Foreign Application Priority Data

Jul. 1, 2016 (KR) ........................ 10-2016-0083272
Jun. 29, 2017 (KR) ........................ 10-2017-0082284

(51) Int. Cl.
*H04W 76/15* (2018.01)
*H04W 28/082* (2023.01)
(Continued)

(52) U.S. Cl.
CPC ......... *H04W 76/15* (2018.02); *H04W 28/082* (2023.05); *H04W 72/21* (2023.01);
(Continued)

(58) Field of Classification Search
CPC ..... H04W 76/15; H04W 76/27; H04W 76/21; H04W 28/082; H04W 88/06; H04L 45/16
See application file for complete search history.

(56) References Cited

U.S. PATENT DOCUMENTS

2014/0321282 A1* 10/2014 Pragada ................ H04W 28/10
370/235
2014/0335882 A1 11/2014 Lee et al.
(Continued)

FOREIGN PATENT DOCUMENTS

CN 103516496 A 1/2014
CN 105659690 A 6/2016
(Continued)

OTHER PUBLICATIONS

Discussion on control plane for the DC based LTE/NR tight interworking (Year: 2016).*
(Continued)

*Primary Examiner* — Michael Thier
(74) *Attorney, Agent, or Firm* — INVENSTONE PATENT, LLC

(57) ABSTRACT

Provided is a method and a device for transmitting or receiving data when a terminal establishes dual connectivity with multiple base stations or multiple cells using different radio access technologies. The method may include receiving, from a master base station, an RRC message indicating establishment of dual connectivity by using the master base station and a secondary base station; establishing a split signaling radio bearer (SRB) connected with two cells or cell groups for dual connectivity establishment; and duplicately transmitting uplink data to each of the mater base station and the secondary base station through the split
(Continued)

signaling radio bearer, wherein the master base station and the secondary base station are base stations using different radio access technologies.

14 Claims, 8 Drawing Sheets

(51) Int. Cl.
*H04W 72/21* (2023.01)
*H04W 76/27* (2018.01)
*H04L 45/16* (2022.01)
*H04W 88/06* (2009.01)

(52) U.S. Cl.
CPC ............ *H04W 76/27* (2018.02); *H04L 45/16* (2013.01); *H04W 88/06* (2013.01)

(56) References Cited

U.S. PATENT DOCUMENTS

2015/0173049 A1 6/2015 Chen et al.
2015/0215965 A1 7/2015 Yamada
2015/0326456 A1 11/2015 Dudda et al.
2016/0028585 A1* 1/2016 Wager .................. H04W 76/15 455/452.2
2016/0174243 A1* 6/2016 Park ................. H04W 72/0413 370/329
2016/0212661 A1* 7/2016 Basu Mallick ... H04W 36/0235
2016/0242080 A1* 8/2016 Vikberg ........... H04W 36/0027
2016/0255619 A1* 9/2016 Yi ........................ H04W 24/08 370/252
2016/0302075 A1* 10/2016 Dudda ................. H04L 63/123
2017/0150384 A1* 5/2017 Rune ..................... H04W 24/10
2017/0331577 A1* 11/2017 Parkvall ................ H04L 5/1469
2018/0041901 A1* 2/2018 Yilmaz ............... H04W 60/005
2018/0352468 A1* 12/2018 Futaki ..................... H04L 5/001
2019/0045398 A1* 2/2019 Chai .................... H04B 17/309
2019/0124716 A1* 4/2019 Hapsari ................... H04W 4/00
2019/0132790 A1* 5/2019 Lee ....................... H04W 76/30
2020/0275315 A1* 8/2020 Futaki .................. H04W 76/20
2020/0322854 A1* 10/2020 Ryoo ................... H04W 68/12

FOREIGN PATENT DOCUMENTS

KR 20090124882 A 12/2009
KR 10-2014-0133463 A 11/2014
KR 10-2015-0109174 A 10/2015
WO 2015/018653 A1 2/2015
WO 2015/060544 A1 4/2015

OTHER PUBLICATIONS

ZTE, "Discussion on control plane for the DC based LTE/NR tight interworking", R2-163741, 3GPP TSG RAN WG2 Meeting #94, Nanjing, China, May 23-27, 2016.
Ericsson, "L2 transport of SRBs and relation to RLF handling", R2-134221, 3GPP TSG-RAN WG2 #84, San Francisco, USA, Nov. 11-15, 2013.
European Patent Office, European Search Report of corresponding EP Patent Application No. 17820554.8, Feb. 3, 2020.

* cited by examiner

450
RRC
NR SRB1
PDCP/Upper L2 entity
L2 entity/ L2 entities
NR Node
NR radio
410
L2 entity/ L2 entities
PDCP/Upper L2 entity
NR SRB1
NR-RRC
UE
400
RRC
LTE SRB1
PDCP
RLC
MAC
eNB
LTE radio
MAC
RLC
PDCP
LTE SRB1
LTE-RRC

FIG.8

METHOD AND DEVICE FOR TRANSMITTING OR RECEIVING DATA IN DUAL CONNECTIVITY STATE

CROSS REFERENCE TO RELATED APPLICATIONS

This application is a National Stage Patent Application of PCT International Patent Application No. PCT/KR2017/006912 (filed on Jun. 29, 2017) under 35 U.S.C. § 371, which claims priority to Korean Patent Application Nos. 10-2016-0083272 (filed on Jul. 1, 2016) and 10-2017-0082284 (filed on Jun. 29, 2017), the teachings of which are incorporated herein in their entireties by reference.

TECHNICAL FIELD

The present disclosure relates to a method and a device for transmitting and receiving data when a user equipment (UE) configures dual connectivity with a plurality of Base Stations (BSs) or cells that use different radio access technologies.

BACKGROUND ART

As communication systems have been advanced, various wireless terminals have been introduced to consumers, such as companies and individuals.

A current mobile communication system has employed technologies related to 3rd generation partnership project (3GPP), for example, Long Term Evolution (LTE), LTE-Advanced (LTE-A), 5G, and the like. Such a mobile communication system has been designed to transmit and receive a large amount of various data, such as image data and wireless data, at a high speed.

In order to further improve traffic throughput of a terminal, many technologies have been developed and introduced, for example, a method of using a small cell for transmitting and receiving data, a method of simultaneously using a macrocell having a wide coverage and a small cell having a relatively small coverage for transmitting and receiving data and a method for simultaneously using a plurality of base stations for transmitting and receiving data.

After LTE-advanced, technology associated with the next generation radio access network has been developed in order to simultaneously support further more terminals to transmit and receive data and to provide higher QoS. For example, many studies and researches have been conducted to develop technologies for 5G network.

However, although the next generation radio access network technology has been developed, many users still use terminals and base stations employing the legacy network technologies. Accordingly, it is required to provide a related service supporting the legacy network and the next generation network together.

The dual connectivity technology enables a terminal to maintain connection with two or more base stations. Since the next generation radio access technology supports base stations employing different network technologies, it is required to redesign the dual connectivity technology to support different network technologies (radio access technologies (RATs)).

However, no method has been introduced for enabling dual connectivity to simultaneously support a base station employing the legacy network technology and a base station employing the next generation network technology.

DETAILED DESCRIPTION OF THE INVENTION

Technical Problem

Therefore, the present disclosure has been made in view of the above-mentioned problems, and an aspect of the present disclosure is to provide a detailed procedure and operations for enabling a user equipment (UE) to perform dual connectivity using a plurality of Base Stations (BSs).

Also, an aspect of the present disclosure is to provide a detailed operation of transmitting data using a split bearer when a UE and BSs configure dual connectivity.

Technical Solution

In accordance with an aspect of the present disclosure, a method may be provided for transmitting and receiving data by a user equipment (UE) that configures dual connectivity. The method may include: receiving, from a master Base Station (master BS), an RRC message indicating configuration of dual connectivity using the master BS and a secondary Base Station (secondary BS); configuring a split signaling radio bearer (split SRB) that is connected to two cells or cell groups, in order to configure the dual connectivity; and performing duplicated transmission of uplink data to each of the master BS and the secondary BS via the split SRB, wherein the master BS and the secondary BS use different radio access technologies.

In accordance with another aspect of the present disclosure, a method may be provided for transmitting and receiving data by a master BS via dual connectivity. The method may include: transmitting an RRC message directing a UE to configure dual connectivity using the master BS and a secondary BS; configuring a split SRB that is connected to the secondary BS, in order to configure the dual connectivity; and performing duplicated transmission of downlink data to the UE via the split SRB at a packet data convergence protocol (PDCP) entity of the master BS, wherein the master BS and the secondary BS use different radio access technologies.

In accordance with another aspect of the present disclosure, a UE may be provided for transmitting and receiving data by configuring dual connectivity. The UE may include: a receiver configured to receive, from a master BS, an RRC message indicating configuration of dual connectivity using the master BS and a secondary BS; a controller configured to configure a split SRB that is connected to two cells or cell groups, in order to configure dual connectivity; and a transmitter configured to perform duplicated transmission of uplink data to each of the master BS and the secondary BS via the split SRB, wherein the master BS and the secondary BS use different radio access technologies.

In accordance with another aspect of the present disclosure, a master BS may be provided for transmitting and receiving data via dual connectivity. The master BS may include: a transmitter configured to transmit an RRC message directing a UE to configure dual connectivity using the mater BS and a secondary BS; and a controller configured to configure a split SRB that is connected to the secondary BS, in order to configure the dual connectivity, wherein the transmitter is configured to perform duplicated transmission of downlink data to the UE via the split SRB at a PDCP entity of the master BS, and the master BS and the secondary BS use different radio access technologies.

Advantageous Effects

According to embodiments of the present disclosure, a user equipment (UE) is enabled to configure dual connectivity using a plurality of Base Stations (BSs) that use different radio access technologies.

Also, according to embodiments of the present disclosure, a UE is enabled to configure dual connectivity using BSs that use different radio access technologies and to perform operation without an error when transmitting and receiving uplink data and downlink data.

BRIEF DESCRIPTION OF THE DRAWINGS

FIG. 8 is a diagram illustrating a Base Station according to an embodiment.

MODE FOR CARRYING OUT THE INVENTION

Figure 1:
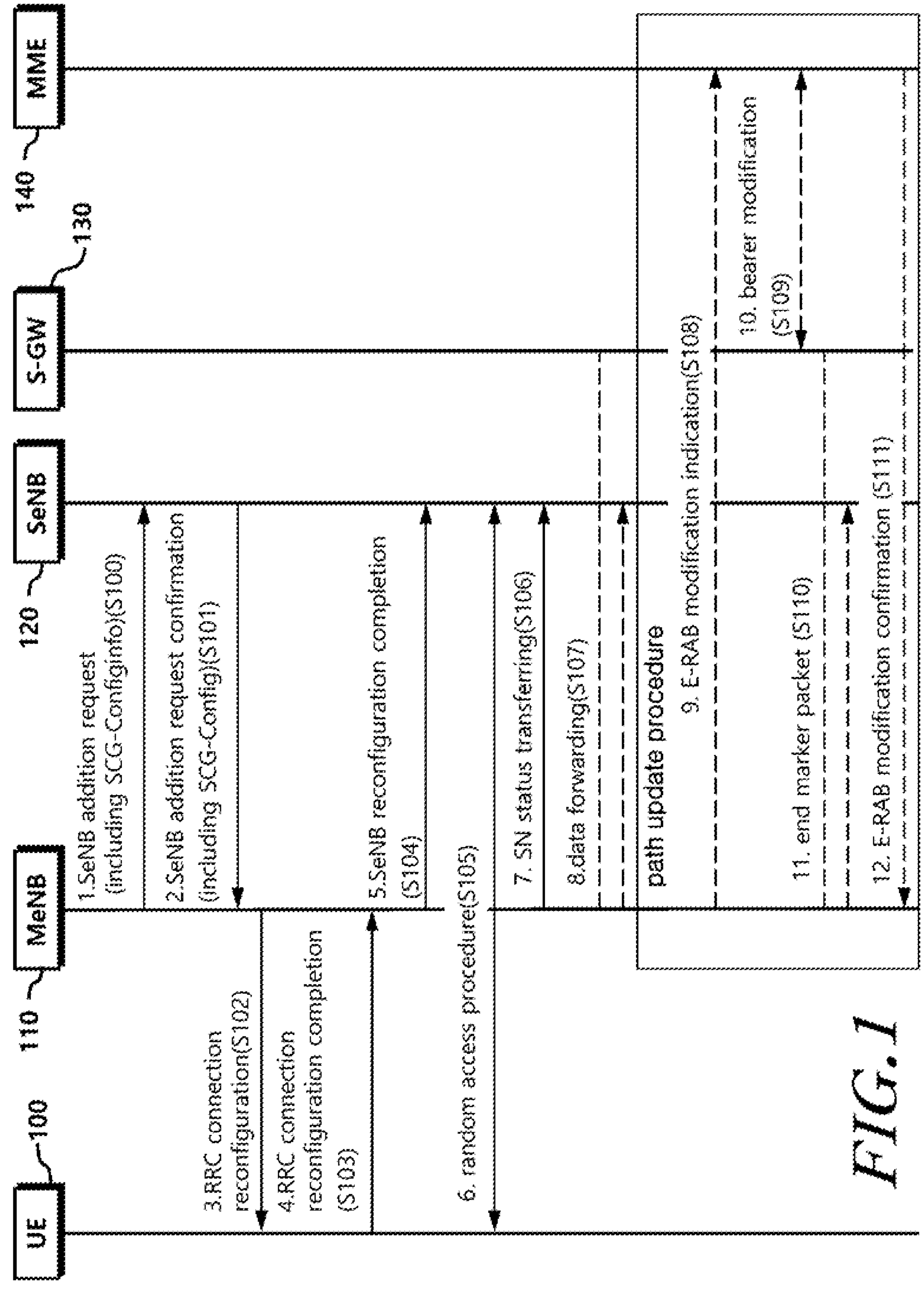
FIG. 1 is a diagram illustrating a secondary evolved NodeB addition procedure according to the related art.

Hereinafter, embodiments of the present disclosure will be described in detail with reference to the accompanying drawings. In adding reference numerals to elements in each drawing, the same elements will be designated by the same reference numerals, if possible, although they are shown in different drawings. Further, in the following description of the present disclosure, a detailed description of known functions and configurations incorporated herein will be omitted when it is determined that the description may make the subject matter of the present disclosure rather unclear.

In the present disclosure, a machine type communication (MTC) terminal refers to a terminal that is low cost (or is not very complexity), a terminal that supports coverage enhancement, or the like. In the present disclosure, the MTC terminal refers to a terminal that supports low cost (or low complexity) and coverage enhancement. Alternatively, in the present disclosure, the MTC terminal refers to a terminal that is defined as a predetermined category for maintaining low costs (or low complexity) and/or coverage enhancement.

In other words, in the present disclosure, the MTC terminal may refer to a newly defined 3GPP Release 13 low cost (or low complexity) UE category/type, which executes LTE-based MTC related operations. Alternatively, in the present disclosure, the MTC terminal may refer to a UE category/type that is defined in or before 3GPP Release-12 that supports the enhanced coverage in comparison with the typical LTE coverage, or supports low power consumption, or may refer to a newly defined Release 13 low cost(or low complexity) UE category/type.

A wireless communication system may be widely installed to provide various communication services, such as a voice service, a packet data service, and the like. The wireless communication system may include a User Equipment (UE) and a Base Station (BS or an eNB). Throughout the present disclosure, the user equipment may be an inclusive concept indicating a user terminal utilized in wireless communication, including a UE (User Equipment) in wideband code division multiple access (WCDMA), long-term evolution (LTE), high speed packet access (HSPA), and the like, and an MS (Mobile station), a UT (Use Terminal), an SS (Subscriber Station), a wireless device, and the like in global systems for mobile communication (GSM).

A base station or a cell may generally refer to a station that performs communication with a User Equipment (UE). The base station or cell may also be referred to as a Node-B, an evolved Node-B (eNB), a Sector, a Site, a Base Transceiver System (BTS), an Access Point, a Relay Node, a Remote Radio Head (RRH), a Radio Unit (RU), and the like.

That is, the base station or the cell may be construed as an inclusive concept indicating a portion of an area covered by a BSC (Base Station Controller) in CDMA, a NodeB in WCDMA, an eNB or a sector (site) in LTE, and the like, and the concept may include various coverage areas, such as a megacell, a macrocell, a microcell, a picocell, a femtocell, a communication range of a relay node, and the like.

Each of the above mentioned various cells has a base station that controls a corresponding cell, and thus, the base station may be construed in two ways. i) The base station may be a device that provides a megacell, a macrocell, a microcell, a picocell, a femtocell, and a small cell in association with a wireless area, or ii) the base station may indicate a wireless area itself. In i), a base station may be all devices that are controlled by one identical entity or that cooperate with each other for providing a predetermined wireless service area. Based on a configuration type of a wireless service area, the base station may be referred to as an eNB, an RRH, an antenna, an RU, a Low Power Node (LPN), a point, a transmission/reception point, a transmission point, a reception point, and the like. In ii), a base station may be a wireless service area itself that enables a terminal or a neighboring base station to receive or transmit a signal.

Therefore, a megacell, a macrocell, a microcell, a picocell, a femtocell, a small cell, an RRH, an antenna, an RU, an LPN, a point, an eNB, a transmission/reception point, a transmission point, and a reception point are commonly referred to as a base station.

In the present disclosure, the user equipment and the base station are used as two inclusive transceiving subjects to embody the technology and technical concepts described in the present disclosure, but embodiments thereof may not be limited to a predetermined term or word. In the present disclosure, the user equipment and the base station are used as two (uplink or downlink) inclusive transceiving subjects to embody the technology and technical concepts described in the specifications, but embodiments of the present disclosure may not be limited to a predetermined term or word. Here, Uplink (UL) refers to a scheme for a UE to transmit and receive data to/from a base station, and Downlink (DL) refers to a scheme for a base station to transmit and receive data to/from a UE.

Varied multiple access schemes may be unrestrictedly applied to the wireless communication system. Various multiple access schemes may include CDMA (Code Division Multiple Access), TDMA (Time Division Multiple Access), FDMA (Frequency Division Multiple Access), OFDMA (Orthogonal Frequency Division Multiple Access), OFDM-FDMA, OFDM-TDMA, OFDM-CDMA, and the like. Embodiments of the present disclosure may be applicable to resource allocation in an asynchronous wireless communication scheme that is advanced to LTE and LTE-advanced through GSM, WCDMA, and HSPA and may be applicable to resource allocation in a synchronous wireless communication scheme that is advanced to UMB through CDMA and CDMA-2000. The present disclosure may not be limited to a specific wireless communication field and may include all technical fields in which the technical idea of the present disclosure is applicable.

Uplink transmission and downlink transmission may be performed based on i) a TDD (Time Division Duplex) scheme that performs transmission based on different times or ii) an FDD (Frequency Division Duplex) scheme that performs transmission based on different frequencies.

Further, a standard related to LTE and LTE-A defines an uplink and a downlink to be configured based on a single carrier or a pair of carriers. The uplink and the downlink may transmit control information through a control channel, such as a PDCCH (Physical Downlink Control CHannel), a PCFICH (Physical Control Format Indicator CHannel), a PHICH (Physical Hybrid ARQ Indicator CHannel), a PUCCH (Physical Uplink Control CHannel), an EPDCCH (Enhanced Physical Downlink Control CHannel), and the like. The uplink and the downlink may transmit data through a data channel, such as a PDSCH (Physical Downlink Shared CHannel), a PUSCH (Physical Uplink Shared CHannel), and the like.

Control information may be transmitted using an EPDCCH (enhanced PDCCH or extended PDCCH).

In the present disclosure, a cell may refer to the coverage of a signal transmitted from a transmission/reception point, a component carrier having the coverage of the signal transmitted from the transmission/reception point (transmission point or transmission/reception point), or the transmission/reception point itself.

A wireless communication system, according to embodiments, refers to a Coordinated Multi-point transmission/reception (CoMP) system where two or more transmission/reception points cooperatively transmit a signal, a coordinated multi-antenna transmission system, or a coordinated multi-cell communication system. A CoMP system may include at least two multi-transmission/reception points and terminals.

A multi-transmission/reception point may be i) a base station or ii) a macro cell (hereinafter, referred to as an 'eNB') and at least one RRH that is connected to the eNB through an optical cable or an optical fiber, is wiredly controlled, and has a high transmission power or a low transmission power within a macro cell area.

Hereinafter, a downlink refers to communication or a communication path from a multi-transmission/reception point to a terminal, and an uplink refers to communication or a communication path from a terminal to a multi-transmission/reception point. In an uplink, a transmitter may be a part of a terminal and a receiver may be a part of a multiple transmission/reception point. In an uplink, a transmitter may be a part of a terminal and a receiver may be a part of a multiple transmission/reception point.

Hereinafter, signal transmission and reception through a PUCCH, a PUSCH, a PDCCH, or a PDSCH, may be described as transmission and reception of a PUCCH, a PUSCH, a PDCCH, or a PDSCH.

In addition, hereinafter, the expression "a PDCCH is transmitted or received, or a signal is transmitted or received through a PDCCH" includes "an EPDCCH is transmitted or received, or a signal is transmitted or received through an EPDCCH".

That is, in the present disclosure, a physical downlink control channel may indicate one of a PDCCH, an EPDCCH, and both a PDCCH and an EPDCCH.

An EPDCCH according to an embodiment of the present disclosure may be applied to another embodiment described using a PDCCH.

Meanwhile, higher layer signaling includes an RRC signaling that transmits RRC information including an RRC parameter.

An eNB executes downlink transmission to terminals. The eNB may transmit a Physical Downlink Shared Channel (PDSCH) which is a primary physical channel for unicast transmission and may transmit a Physical Downlink Control Channel (PDCCH) for transmitting downlink control information, such as scheduling required for reception of a PDSCH, and scheduling grant information for transmission of an uplink data channel (for example, a Physical Uplink Shared Channel (PUSCH)). Hereinafter, transmission and reception of a signal through each channel will be described as transmission and reception of a corresponding channel.

LTE Dual Connectivity Operation

The legacy LTE technology supports dual connectivity for enabling a user equipment to use radio resources of two Base Stations (BSs) together. The dual connectivity may enable multiple RX/TX UEs in the RRC-connected state to use radio resources provided by two different schedulers connected to two BSs which are connected via non-ideal backhaul.

In dual connectivity, a user equipment (UE) may provide a service via two BSs. For example, the UE may perform communication using a master BS (MeNB) and a secondary BS (SeNB). The MeNB may be a BS that provides an RRC connection to the UE and that is the base of handover. The SeNB may be a BS that provides additional radio resources to the UE.

A SeNB addition procedure for setting UE context at the SeNB may be used in order to provide SeNB radio resources to the UE.

FIG. 1 is a signal flow diagram illustrating a SeNB addition procedure according to a related art.

Each operation will be described in detail with reference to FIG. 1.

1. In operation S100, the MeNB 110 decides to request the SeNB 120 to allocate radio resources for a specific E-RAB, indicating E-RAB characteristics (e.g., E-RAB parameters, TNL address information corresponding to the UP option). In addition, MeNB 110 indicates within SCG-ConfigInfo the MCG configuration (including security algorithm for SCG bearer) and the entire UE capabilities for UE capability coordination to be used as basis for the reconfiguration by the SeNB 120, but does not include SCG configuration. The MeNB 110 can provide the latest measurement results for the SCG cell(s) requested to be added. The SeNB 120 may reject the request.

2. In operation S101, if the RRM entity in the SeNB 120 is able to admit the resource request, it allocates respective radio resources and, dependent on the bearer option, respective transport network resources. The SeNB 120 triggers Random Access so that synchronization of the SeNB 120 radio resource configuration can be performed. The SeNB 120 may provide a new radio resource of an SCG in SCG-Config to the MeNB 110 For SCG bearers, together with S1 DL TNL address information for the respective E-RAB and security algorithm, for split bearers X2 DL TNL address information.

3. In operation S102, if If the MeNB110 endorses the new configuration, the MeNB110 sends the RRCConnectionReconfiguration message to the UE including the new radio resource configuration of SCG according to the SCG-Config.

4. In operation 103, The UE applies the new configuration and replies with RRCConnectionReconfigurationComplete message. In case the UE is unable to comply with (part of) the configuration included in the RRCConnectionReconfiguration message, it performs the reconfiguration failure procedure.

5. In operation 104, the MeNB 110 informs the SeNB 120 that the UE 100 has completed the reconfiguration procedure successfully.

6. In operation S105, the UE 100 performs synchronization towards the PSCell of the SeNB120. The order the UE sends the RRCConnectionReconfigurationComplete message and performs the Random Access procedure towards the SCG is not defined. The successful RA procedure towards the SCG is not required for a successful completion of the RRC Connection Reconfiguration procedure.

7./8. In operations S106 and S107, in case SCG bearers, and dependent on the bearer characteristics of the respective E-RAB, the MeNB 110 may take actions to minimize service interruption due to activation of dual connectivity (Data forwarding, SN Status Transfer).

9. -12. In operations S108 to S111, for SCG bearers, the update of the UP path towards the EPC is performed.

When the MeNB 110 sends the RRC connection reconfiguration message including the new radio resource configuration of the secondary cell group in operation S102, the UE 100 may apply the new configuration, as shown in operation S103. When the UE 100 is incapable of complying with (a part of) the configuration included in the RRC connection reconfiguration message, the UE 100 may perform a reconfiguration failure procedure.

In the legacy LTE's dual connectivity technology that is provided on the basis of the coordination between two LTE BSs, the MeNB 110 is capable of understanding a radio resource control (RRC) message of the SeNB 120. Also, by taking into consideration the UE capabilities and the coordination with the SeNB 120, the MeNB 110 may generate a final RRC message and may indicate the same to the UE 100, whereby radio resources based on two BSs are effectively used. The RRC message may be provided via a wireless interface between the UE 100 and the MeNB 110.

NR (New Radio)

3GPP is currently conducting research on the next generation radio access technology (hereinafter referred to as "NR" for ease of description). As requirements of the architecture for the next generation radio access technology and the migration thereto, the RAN architecture may need to support tight interworking between NR and LTE. For the tight interworking between NR and LTE, LTE dual connectivity may be expected to be reused. However, NR as new radio access technology may employ various evolved features on a physical layer, a layer 2 protocol, and a procedure. Therefore, it is realistically difficult that an LTE BS supports all the features of NR which are to be evolved in the future, when the tight interwork between LTE and NR is supported. Updating an LTE BS every time that an NR BS evolves may be an excessive burden to the LTE BS which has already been configured. Therefore, in dual connectivity configured by an LTE BS and an NR BS, the LTE BS needs to be capable of operating even through the LTE BS does not understand an RRC message generated by the NR BS. In this instance, since the NR BS is incapable of identifying a change in the radio resource configuration of the NR BS, the LTE BS may have difficulty performing UE configuration within UE capabilities.

Also, in the legacy dual connectivity technology, an RRC message is transmitted only via an MeNB. For example, when a radio resource of an SeNB is changed by request from an MeNB, the radio resource configuration information of the SeNB may be configured for a UE via the MeNB. Therefore, a transmission delay between BSs may be always added when a radio resource of the NR BS is changed.

NR may be established even in a high-frequency band (e.g., a 6 GHz or more high-frequency band). In this instance, due to the link blockage of the high-frequency band and high transmission loss, quick SINR drops may occur. That may cause a delay when the NR BS desires to send an RRC message via the interface between NR and a UE.

The dual connectivity technology based on the legacy LTE is configured for a UE on the basis of the coordination between two LTE BSs. Accordingly, it is difficult to directly apply the dual connectivity technology based on the legacy LTE to the dual connectivity technology between LTE and NR. For example, the NR BS is incapable of directly transmitting an RRC message to a UE after the generating the RRC message. Even through the NR BS generates and directly transmits the RRC message to a UE, an RRC message transmission delay may occur when the NR BS uses a high-frequency band.

The present disclosure, derived in order to overcome the above-described problems, is to provide a method and apparatus for processing a radio resource control signaling of an NR BS for an LTE-NR dual connectivity operation that supports tight interwork between LTE and NR. Also, the present disclosure is to provide a method of a BS for distinctively processing RRC messages using two different radio access links.

The present disclosure may be applied to a UE in the next generation mobile communication (e.g., 5G mobile communication), in addition to a UE in LTE mobile communication.

For ease of description, a BS may indicate an LTE BS, which is an eNodeB of LTE/E-UTRAN. Also, BS may indicate a gNodeB, or an NR node or NR BS (a central unit (CU), a distribute unit (DU), or an entity in which a CU and a DU are implemented as a single logical entity, and hereinafter it is referred to as an NR BS for ease of description but above-described all entities are included in the scope of the present disclosure) in the 5G wireless network in which the CU and the DU is separated.

In addition, in the present specification, in order to describe a method of configuring dual connectivity of an LTE BS and an NR BS that use different radio access technologies, the LTE BS may be described as a master BS and the NR BS may be described as a secondary BS, as it is needed. However, the present disclosure is applicable to the dual connectivity between LTE BSs and thus, may be applied equally when the secondary BS is an LTE BS.

Therefore, in the following descriptions, an LTE BS and an NR BS may be compartmentalized, and when it is needed to specifically describe the operation based on dual connectivity, the LTE BS is described as a master BS (MeNB) and the NR BS is described as a secondary BS (SeNB). The name of each BS is for ease of understanding, and the LTE BS may indicate an eNB, and the NR BS may indicate a gNB. That is, the present disclosure compartmentally describes BSs in order to distinguish BSs that use different radio access technologies, but the embodiments of the present disclosure are not limited to those terms.

In order to connect a core-network in dual connectivity for NR, following scenarios may be considered.

When NR is integrated with LTE and is connected via EPC, a control plane may be connected between an LTE BS and an EPC entity (MME), and a user plane may be disconnected from a core-network or a radio network.

When LTE is integrated with NR and is connected via NG-Core (5G core-network), a control plane may be connected between an NR BS and an NG-Core control plane entity, and a user plane may be disconnected from a core-network or a radio network.

When NR is integrated with LTE and is connected via NG-Core (5G core-network), a control plane may be connected between an LTE BS and an NG-Core control plane entity, and a user plane may be disconnected from a core-network or a radio network.

The following three cases may be considered as dual/multi connectivity for NR (hereinafter, dual connectivity is used for ease of description, but providing two or more connectivity is included in the scope of the present disclosure).

LTE (Master Node)—NR (Secondary Node)

NR (Master Node)—NR (Secondary Node)

NR (Master Node)—LTE (Secondary Node)

For ease of description, the present disclosure may provide descriptions using the case of LTE (Master Node)-NR (Secondary Node), which is able to use the well configured LTE coverage. However, as described above, that is for ease of description, the case of NR (Master Node)-NR (Secondary Node) and the case of NR (Master Node)-LTE b(Secondary Node) are included in the scope of the present disclosure.

An NR BS may control NR radio resources of a UE. Alternatively, an LTE BS may control NR radio resources of a UE.

The NR BS may perform one or more control functions among i) a function of adding (modifying, releasing, or managing) an NR cell (a cell group, a transmission point, a transmission point group, a transmission and reception point, a transmission and reception point group, a TRP, an antenna, an antenna group, or a beam (hereinafter referred to as a cell)), ii) an NR measurement function, iii) an NR measurement reporting function, iv) an NR resource allocation function, v) an NR radio bearer addition/modification/release function, vi) an NR radio resource configuration function, and vii) an NR mobility control function. The NR BS may instruct one or more of the above-described control functions to a UE via an RRC configuration or reconfiguration message.

For example, each of an LTE RRC entity of the LTE BS and an NR RRC entity of the NR BS may independently indicate a corresponding BS radio resource control configuration. As another example, the LTE RRC entity of the LTE BS may independently instruct a corresponding BS radio resource control configuration via the interface between LTE and the UE, and the NR RRC entity of the NR BS may independently instruct a corresponding BS radio resource control configuration via the interface between NR and the UE. As another example, each of the LTE RRC entity of the LTE BS and the NR RRC entity of the NR BS may independently instruct a corresponding BS radio resource control configuration within the scope of UE capabilities. As another example, each of the LTE RRC entity of the LTE BS and the NR RRC entity of the NR BS may instruct a corresponding BS radio resource control configuration via coordination. As another example, the LTE RRC entity of the LTE BS may instruct an LTE BS radio resource control configuration via an LTE radio link and an NR radio link. As another example, the NR RRC entity of the NR BS may instruct an LTE BS radio resource control configuration via an NR radio link and an LTE radio link.

The detailed methods for the transmission of a radio resource control signaling described above will be described later.

Hereinafter, operations of a UE and a BS for transmitting an RRC message via two radio links and processing by applying LTE-NR dual connectivity will be described with reference to drawings.

Figure 2:
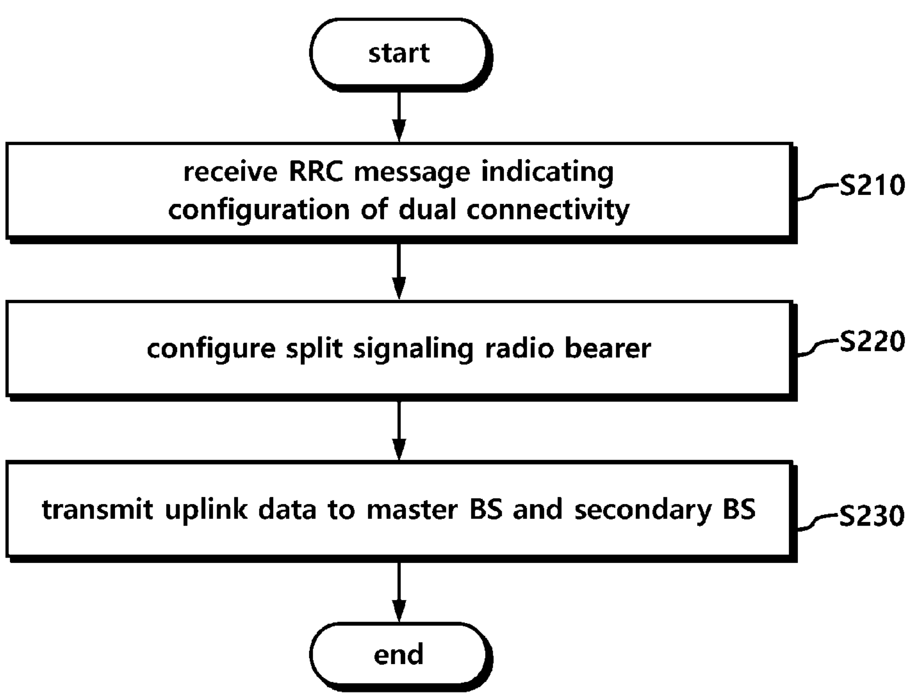
FIG. 2 is a flowchart illustrating operations of a user equipment according to an embodiment.

FIG. 2 is a flowchart illustrating operations of a UE according to an embodiment.

Referring to FIG. 2, a UE that configures dual connectivity may receive, from a master BS, an RRC message instructing configuration of dual connectivity using the master BS and a secondary BS, in operation S210.

For example, the RRC message may include configuration information such that the UE configures dual connectivity using the master BS and the secondary BS which are based on different access technologies. The configuration information may include cell information, cell group information, RRC connection information, and the like associated with the master BS and the secondary BS.

As another example, the RRC message may include information instructing duplicated transmission of uplink data using a split signaling radio bearer at a packet data convergence protocol (PDCP) entity of the UE. Alternatively, the RRC message may include information for setting a data transmission path of a split signaling radio bearer.

The UE may configure a split signaling radio bearer (Split SRB) connected to two cells or cell groups, in order to configure dual connectivity, in operation S220.

For example, the UE may configure a split signaling radio bearer connected to a cell associated with the master BS and to a cell associated with the secondary BS.

As another example, the UE may configure a split signaling radio bearer connected to a master cell group including one or more cells associated with the master BS and to a secondary cell group including one or more cells associated with the secondary BS.

The split signaling radio bearer may be configured via links of the master

BS and the secondary BS to the UE and may be different from a bearer connected only via the master BS and a bearer connected only via the secondary BS. Also, the split signaling radio bearer may be configured by being split from the PDCP entity of the master BS or the PDCP entity of the secondary BS.

Also, the UE may perform duplicated transmission of uplink data to each of the master BS and the secondary BS via the split signaling radio bearer in operation S230.

For example, when information for indicating duplicated transmission or the path of uplink data is set to duplicated transmission and is received, the packet data convergence protocol (PDCP) entity of the UE may transfer a PDCP protocol data unit (PDCP PDU) generated by duplicating a PDCP service data unit (PDCP SDU) including the uplink data, to radio link control (RLC) entities which are configured to be connected to the master BS and the secondary BS, respectively. That is, the UE may include an RLC entity configured to peer with the master BS and an RLC entity configured to peer with the secondary BS. It is the case in which duplicated transmission of uplink data is set, the UE may transfer, to two RLC entities, a PDCP PDU associated with the same data using a PDCP entity. Each RLC entity may transfer the uplink data to the RLC entity of each of the master BS and the secondary BS. That is, the same uplink data may be duplicately transmitted via a master BS link and a secondary BS link. Although the present disclosure describes, as an RLC entity, the layer 2 entity of the NR BS that performs all or some of the functions performed by the RLC entity of the LTE BS, the embodiments of the present disclosure are not limited to the name of the entity.

As another example, when information for indicating duplicated transmission or the path of uplink data is set to a master cell group or secondary cell group transmission path and is received, the packet data convergence protocol (PDCP) entity of the UE may transfer a PDCP service data unit (PDCP SDU) including the uplink data to a radio link control (RLC) entity configured to be connected to the master cell group or the secondary cell group.

Similar to the transmission of uplink data by the UE, the UE may duplicately receive downlink data via the master BS and the secondary BS.

In this instance, the packet data convergence protocol (PDCP) entity of the UE may discard any one of the downlink data duplicately received from the master BS and the secondary BS via a split signaling radio bearer. For example, the PDCP entity of the UE may discard any one of the data having the same sequence number from among the duplicately received downlink data. Through the above, data transferred to the upper of the PDCP entity may be transferred without duplication.

The master BS and the secondary BS described in the above descriptions are BSs that use different radio access technologies. For example, the master BS is an LTE eNB, and the secondary BS is an NR gNB.

Figure 3:
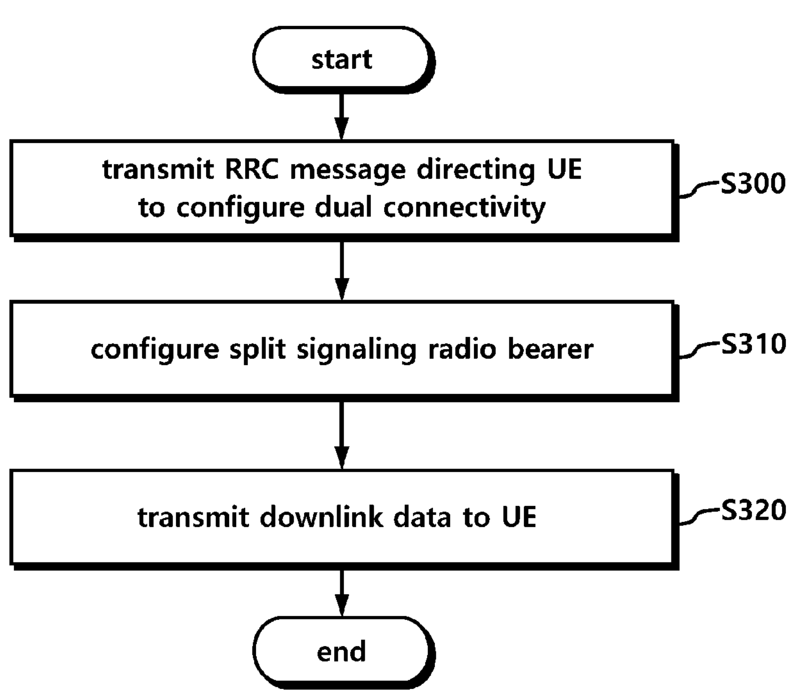
FIG. 3 is a flowchart illustrating operations of a Base Station according to an embodiment.

FIG. 3 is a flowchart illustrating operations of a BS according to an embodiment.

Referring to FIG. 3, a master BS that transmits and receives data via dual connectivity transmits an RRC message instructing a UE to configure dual connectivity using the master BS and a secondary BS in operation S300.

For example, the RRC message may include configuration information for directing the UE to configure dual connectivity using the master BS and the secondary BS which employ different access technologies. The configuration information may include cell information, cell group information, RRC connection information, and the like associated with the master BS and the secondary BS.

As another example, the RRC message may include information instructing a packet data convergence protocol (PDCP) entity of a UE to perform duplicated transmission of uplink data using a split signaling radio bearer. Alternatively, the RRC message may include information for setting the data transmission path of a split signaling radio bearer.

Also, the master BS configures a split signaling radio bearer (split SRB) connected to a secondary BS in order to configure dual connectivity in operation S310.

For example, the master BS may configure a split signaling radio bearer connected to the cell of the master BS and the cell associated with the secondary BS.

As another example, the master BS may configure a split signaling radio bearer connected to a master cell group including one or more cells associated with the master BS and to a secondary cell group including one or more cells associated with the secondary BS.

The split signaling radio bearer may be configured via links of the master BS and the secondary BS to the UE and may be different from a bearer connected only via the master BS and a bearer connected only via the secondary BS. Also, the split signaling radio bearer may be configured by being split from the PDCP entity of the master BS or the PDCP entity of the secondary BS.

Also, the master BS may perform duplicated transmission of downlink data to the UE via the split signaling radio bearer, at a packet data convergence protocol (PDCP) of the master BS, in operation S320.

For example, the PDCP entity of the master BS may transfer a PDCP protocol data unit (PDCP PDU) generated by duplicating a PDCP service data unit (PDCP SDU) including downlink data to an RLC entity of the master BS and an RLC entity of the secondary BS. For example, when the information for indicating duplicated transmission or the path of downlink data is set to duplicated transmission, the master BS may transmit the same downlink data to the RLC entities of the master BS and the secondary BS, thereby performing duplicated transmission to the UE. Although the present disclosure describes, as an RLC entity, the layer 2 entity of the NR BS that performs all or some of the functions performed by the RLC entity of the LTE BS, the embodiments of the present disclosure are not limited to the name of the entity.

As another example, when information for indicating duplicated transmission or the path of downlink data is set to a master cell group or secondary cell group transmission path, the packet data convergence protocol (PDCP) entity of the master BS may transfer a PDCP service data unit (PDCP SDU) including the downlink data to a radio link control (RLC) entity configured to be connected to the master cell group or the secondary cell group.

The PDCP entity of the master BS may discard any one of the uplink data duplicately received from the UE via a split signaling radio bearer. For example, the PDCP entity of the master BS may discard any one of the data having the same sequence number from among the duplicately received uplink data. Through the above, data transferred to the upper of the PDCP entity may be transferred without duplication.

The master BS and the secondary BS described in the above descriptions are BSs that use different radio access technologies. For example, the master BS is an LTE eNB, and the secondary BS is an NR gNB.

As described in the above, the UE may duplicately transmit uplink data or duplicately receive downlink data via a split signaling radio bearer. To this end, the BS may set a data transmission path via the split signaling radio bearer. Also, the PDCP entities of the UE and the master BS may perform duplicated transmission and may perform operations for discarding the duplicately received data.

Hereinafter, various embodiments showing that a UE and a BS perform data transmission and reception via a split signaling radio bearer will be described in detail.

As described above, each of an LTE RRC entity of an LTE BS and an NR RRC entity of an NR BS may independently indicate a corresponding BS radio resource control configuration. Alternatively, each of the LTE RRC entity of the LTE BS and the NR RRC entity of the NR BS may instruct a corresponding BS radio resource control configuration via coordination. Alternatively, the LTE RRC entity of the LTE BS may instruct an LTE BS radio resource control configuration via an LTE radio link and an NR radio link. Alternatively, the NR RRC entity of the NR BS may instruct an NR BS radio resource control configuration via the NR radio link and the LTE radio link. Alternatively, an NR RRC entity of the UE may transmit an NR RRC message to the NR BS via the NR radio link and the LTE radio link. Alternatively, an LTE RRC entity of the UE may transmit an NR RRC message to the NR BS via the LTE radio link and the NR radio link.

When each BS (or a UE) transmits one RRC message via two radio links by reason of reliable RRC message transmission (or for an arbitrary reason), the BS (or the UE) needs to transmit the RRC message via two radio links and a counterpart UE (or a counterpart BS) needs to receive and process the same distinctively. To this end, the following methods may be used independently or in combination.

Hereinafter, embodiments of the present disclosure will be described based on an NR BS (or a UE) and a counterpart UE (or a counterpart NR BS) that perform transmission and reception (e.g., in the case of transmitting an NR RRC message via two paths) for convenience of description and ease of understanding. However, the embodiments of the present disclosure are not limited thereto. For example, the embodiments may be applicable when an LTE BS (or a UE) and a counterpart UE (or a counterpart LTE BS) perform transmission and reception (e.g., the case of transferring an LTE RRC message via two paths and the case of transferring an RRC message of an MeNB to the interface between the MeNB and a UE and to the interface between an SeNB and the UE).

1. Method of Transmission and Reception via Two Links in RRC Layer

An NR RRC entity of an NR BS (or a UE) generates an NR RRC message. The generated NR RRC message is transferred via NR-SRB1 such that the NR RRC message is transferred to the radio link between the NR BS and the UE. Alternatively, the same is submitted to a lower layer. The NR RRC entity of the NR BS (or the UE) may transfer the NR RRC message to the UE (or NR RRC) via the LTE BS. In association with the downlink RRC message, the NR BS (RRC entity of the NR BS) may transfer an NR RRC container/NR RRC IEs/NR RRC message including the NR RRC IEs to the LTE BS. The LTE BS (or the RRC entity of the LTE BS) may transfer the NR RRC container/NR RRC IEs/an RRC message including NR RRC IEs to the UE (or the LTE RRC entity of the UE) via an LTE SRB (LTE SRB1). The LTE RRC entity of the UE transfers the same to the NR RRC entity of the UE.

The LTE RRC may include, in an RRC reconfiguration message, the NR RRC container/NR RRC IEs/RRC message including NR RRC IEs as a transparent container and may transfer the same to the UE.

In association with the above, for example, information for instructing sending a radio link path of a single uplink RRC message through two radio links may be included in the RRC message and may be configured for the UE. As another example, information for instructing duplication of a single uplink RRC message and transmission of the duplicated uplink RRC messages via two links may be included in the RRC message and may be configured for the UE. As another example, information instructing transmitting a radio link path of an uplink RRC message may be included in the RRC message and configured for the UE. As another example, information for instructing duplication of a single uplink RRC message and transmission of the duplicated uplink RRC messages via two radio links may be included in the RRC message and may be configured for the UE.

2. Method of Transmission and Reception Via Two Links in PDCP Layer

As described with reference to FIGS. 2 and 3, an NR RRC entity of an NR BS (or a UE) generates an NR RRC message. The generated NR RRC message is transferred via NR-splitSRB1 such that the NR RRC message is transferred to the radio link between the NR BS and the UE and the radio link between the LTE BS and the UE. Alternatively, the same may be submitted to a lower layer. The NR RRC entity of the NR BS (or the UE) transfers the generated NR RRC message to a PDCP entity (an upper L2 entity).

For example, the PDCP entity (the upper L2 entity) duplicates a PDCP SDU including the NR RRC message. A PDCP PDU including one NR RRC message is transferred to an LTE RLC entity. A PDCP PDU including the other NR RRC message is transferred to an NR L2 entity.

As another example, information for instructing enablement of a function for transmitting PDCP data including an uplink RRC message via two radio links at the PDCP (upper L2 entity) may be included in an RRC message and may be configured for the UE.

As another example, information for instructing duplication of a PDCP SDU/PDU such that a PDCP (upper L2 entity) transmits PDCP data including an uplink RRC message via two radio links and/or indicating submission of the same to each associated lower layer entity may be included in an RRC message and may be configured for the UE.

As another example, information indicating a radio link path of an uplink RRC message may be included in an RRC message and may be configured for the UE.

The same duplicated PDCP data may be discarded by a PDCP entity that peers. The BS may indicate, to the UE, information instructing discarding duplicated PDCP PDU/SDU including the same RRC message and may configure the same for the UE.

As another example, the NR RRC entity of the NR BS (or the UE) generates an NR RRC message. The NR RRC message may be duplicated. The NR RRC entity transmits the generated NR RRC message via NR-splitSRB1 in order to transfer the same to the radio link between the NR BS and the UE and the radio link between the LTE BS and the UE. Alternatively, the NR RRC is submitted to a lower layer. The NR RRC entity of the NR BS (or the UE) transfers the generated NR RRC message to a PDCP entity (an upper L2 entity). The PDCP entity may transmit a PDCP SDU including an RRC message received earlier and a PDCP SDU including an RRC message received subsequently, via different paths (an LTE BS radio link and an NR BS radio link).

Here, in the embodiments of the present disclosure the NR BS is described as a mater BS. However, the embodiments of the present disclosure are not limited thereto. For example, the embodiments of the present disclosure may be equally applied when the LTE BS is a master BS, as described in FIGS. 2 and 3. In this instance, the PDCP entity of the LTE BS may configure a split SRB. The PDCP entity of the LTE BS may duplicate and discard PDCP data.

3. Method of Adding RRC Message Identification Information/Sequence Number Field By reason of reliable RRC message transmission (or for an arbitrary reason), a transmitting end transmits an RRC message via two radio links, and a receiving end may identify duplicated RRC messages, which are the same RRC message received via the two radio links. The receiving end may discard/drop/remove/scrap the duplicated RRC message. A BS may configure information in order to instruct the same to a UE.

The transmitting end (a BS or a UE) may include identification information in the RRC message for identifying the same RRC message. For example, the identification information for identifying an RRC message may be increased as a new RRC message is generated. After the largest value is used for identification information, the smallest value is cyclically used again for identification information. For example, when a value is in the range from 0 to 3 (or 1 to 4), the value for a first RRC message is 0 (or 1), and the value for a subsequent RRC message is increased by one. When the value of an RRC message reaches 3 (or 4), a subsequent RRC message may be cyclically 0 (or 1) again.

If the receiving end (a counterpart UE or BS) receives an RRC message that includes RRC message identification information that is the same as that of an RRC message received earlier, the receiving end may discard/drop/remove/scarp the corresponding RRC message.

If the receiving end (the counterpart UE or BS) receives an RRC message that includes RRC message identification information that is the same as that of an RRC message received earlier, the receiving end may transmit a confirmation message associated with the same to the transmitting end.

The BS configures, for the UE, information for indicating that RRC message identification information is included in an RRC message. When the corresponding information is configured, the UE may recognize that the RRC message identification information is included.

4. Method of Using Transaction Identifier

By reason of reliable RRC message transmission (or for an arbitrary reason), a transmitting end transmits an RRC message via two radio links, and a receiving end may identify duplicated RRC messages, which are the same RRC message received via the two radio links. The receiving end may discard/drop/remove/scrap the duplicated RRC message. A BS may configure information in order to indicate the same to a UE.

The duplicated RRC message may be identified using the transaction identifier included in the RRC message, and the duplicated RRC message may be discarded/dropped/removed/scrapped.

If it is included, the UE may set, in a response message, an RRC transaction identifier that is the same as an RRC transaction identifier included in a message received from the BS which triggers the response message.

The UE may include a transaction identifier in an RRC message that does not trigger a response message and may transmit the same, such that a duplicated RRC message is identified. For example, the UE may include a transaction identifier in a MeasurementReport message and may transmit the same. As another example, the UE may include a transaction identifier in all RRC messages and may transmit the same.

If the receiving end (a counterpart UE or BS) receives an RRC message that includes a transaction identifier that is the same as that of an RRC message received earlier, the receiving end may discard/drop/remove/scarp the corresponding RRC message.

If the receiving end (the counterpart UE or BS) receives an RRC message that includes RRC message identification information that is the same as that of an RRC message received earlier, the receiving end may transmit a confirmation message associated with the same to the transmitting end.

Hereinafter, embodiments for configuring dual connectivity and transmits an RRC signaling will be described. That is, methods for the transmission of a radio resource control signaling described above will be described. For RRC signaling transmission, the following methods may be used independently or in combination.

1. Use LTE BS SRB (Signaling Radio Bearer)

For example, an NR BS may transfer an NR RRC message (e.g., an RRC message generated by an NR BS) to a UE via an LTE BS. To this end, in association with a downlink RRC message, the NR BS (an RRC entity of the NR BS) may transfer an NR RRC container/NR RRC IEs/NR RRC message including the NR RRC IEs to the LTE BS. The LTE BS (or an RRC entity of the LTE BS) may transfer the NR RRC container/NR RRC IEs/an RRC message including NR RRC IEs to the UE (or an RRC entity of the UE) via an LTE SRB. The LTE RRC may include, in an RRC reconfiguration message, the NR RRC container/NR RRC IEs/RRC message including NR RRC IEs as a transparent container, and may transfer the same to the UE.

This method may transmit the RRC configuration information of the NR BS to the UE by minimizing a change of the LTE BS. However, according to the method, a delay associated with data transmission between the LTE BS and the NR BS increases. Also, the NR BS needs to receive a confirmation message associated with the NR RRC configuration of the UE from the LTE BS. This is also a factor that causes a delay.

In order to overcome the above drawback, the LTE BS may direct the RRC entity of the UE to directly transmit an RRC reconfiguration confirmation message to the NR BS when the LTE BS transfers an NR RRC container/NR RRC IEs/RRC message including NR RRC IEs to the UE (or the RRC entity of the UE).

For example, the LTE RRC entity of the UE that receives the NR RRC container/NR RRC IEs/RRC message including NR RRC IEs via an LTE SRB may transfer/submit the same to the NR RRC entity. The NR RRC entity may apply a new configuration. The NR RRC entity may reply with an RRC reconfiguration confirmation message via the interface between the UE and the NR BS.

As another example, the RRC entity of the UE that receives the NR RRC container/NR RRC IEs/RRC message including NR RRC IEs via an LTE SRB may apply a new configuration. The RRC entity of the UE may reply with an RRC reconfiguration confirmation message via the interface between the UE and the NR BS.

The RRC reconfiguration message (or the NR RRC container/NR RRC IEs/RRC message including NR RRC IEs) may include information used for indicating, by the NR BS (or the LTE BS), operations that the UE needs to perform.

For example, the RRC reconfiguration message (or the NR RRC container/NR RRC IEs/RRC message including NR RRC IEs) may include information used for directing the UE to generate/enable/activate an NR RRC entity.

As another example, when the UE receives the NR RRC container/NR RRC IEs/RRC message including NR RRC IEs (or an RRC message including information indicating an original NR addition configuration (NR configuration setup)), the UE may enable the NR RRC entity to enable/activate the NR addition configuration (or the UE may configure/generate an NR RRC entity).

As another example, when the UE receives an RRC message including information indicating release of NR radio resources, the UE may disable/deactivate/release an NR RRC entity.

As another example, the RRC reconfiguration message (or the NR RRC container/NR RRC IEs/RRC message including NR RRC IEs) may include information for directing the UE to transmit an RRC confirmation message via the interface between the UE and the NR BS, at the NR RRC entity.

As another example, the RRC reconfiguration message (or the NR RRC container/NR RRC IEs/RRC message including NR RRC IEs) may include NR BS SRB configuration information such that the UE transmits an RRC confirmation message via the interface between the UE and the NR BS, at the NR RRC entity.

2. Configure SRB by NR BS

For example, an NR BS may transmit an NR RRC message to a UE via the interface between the NR BS and the UE. To this end, when configuring LTE-NR dual connectivity (or when configuring NR additional radio resources) for the UE, the NR BS may configure an SRB (e.g., SRB1) between the UE and the NR BS. This indicates that the NR BS determines to add an SRB (e.g., SRB1) for the corresponding UE, between the UE and the NR BS, and generates configuration information for the same. For reference, SRB1 is configured in RRC connection setup in the legacy LTE. However, setup of SRB1 (for ease of descriptions, a signaling radio bearer configured to transmit data via the interface between an NR BS and a UE is referred to as NR-SRB1, it is not limited to the corresponding term.) between the NR BS and the UE is configured via an RRC reconfiguration message that configures LTE-NR dual connectivity (NR additional radio resources).

When security is activated, all RRC messages on NR-SRB1 (or SRB1/SRB2) may need to be ciphered and integrity protected by a PDCP (or an L2 entity on NR). It may be understood that the LTE-NR dual connectivity is applied to an RRC connected UE. Therefore, all RRC messages on NR-SRB1 may need to be ciphered and integrity protected by the PDCP (or (upper) L2 entity on NR).

To this end, security needs to be always activated for NR-SRB1 from the beginning. The LTE BS needs to avoid setting the corresponding bearer before security for the bearer is activated. The LTE BS needs to avoid requesting NR BS addition before security is activated. The NR BS may set NR-SRB1 by request for NR BS addition from the LTE BS.

For example, when requesting NR BS addition, the LTE BS needs to transfer (or calculate and transfer) an NR BS key (e.g., NR-$K_{BS}$) to the NR BS. The NR BS may select an integrity protection algorithm and a ciphering algorithm. The selected integrity protection algorithm and ciphering algorithm (or identification information of the integrity protection algorithm and the ciphering algorithm) by which NR-SRB1 is to be serviced to the UE, may be transferred to the UE via the LTE BS. The LTE BS (or NR BS) may indicate, to the UE, a counter (an SCG counter or an NR counter) to be used when the UE calculates a key value associated with NR-SRB1. The UE calculates the NR BS key. The UE may calculate the key value (NR-$K_{RRCint}$, NR-$K_{RRCenc}$) associated with NR-SRB1. The UE may perform configuration such that a lower layer (a PDCP or L2 entity on NR) applies the integrity protection algorithm, ciphering algorithm, NR-KRRont, and NR-KRRcenc.

Figure 4:
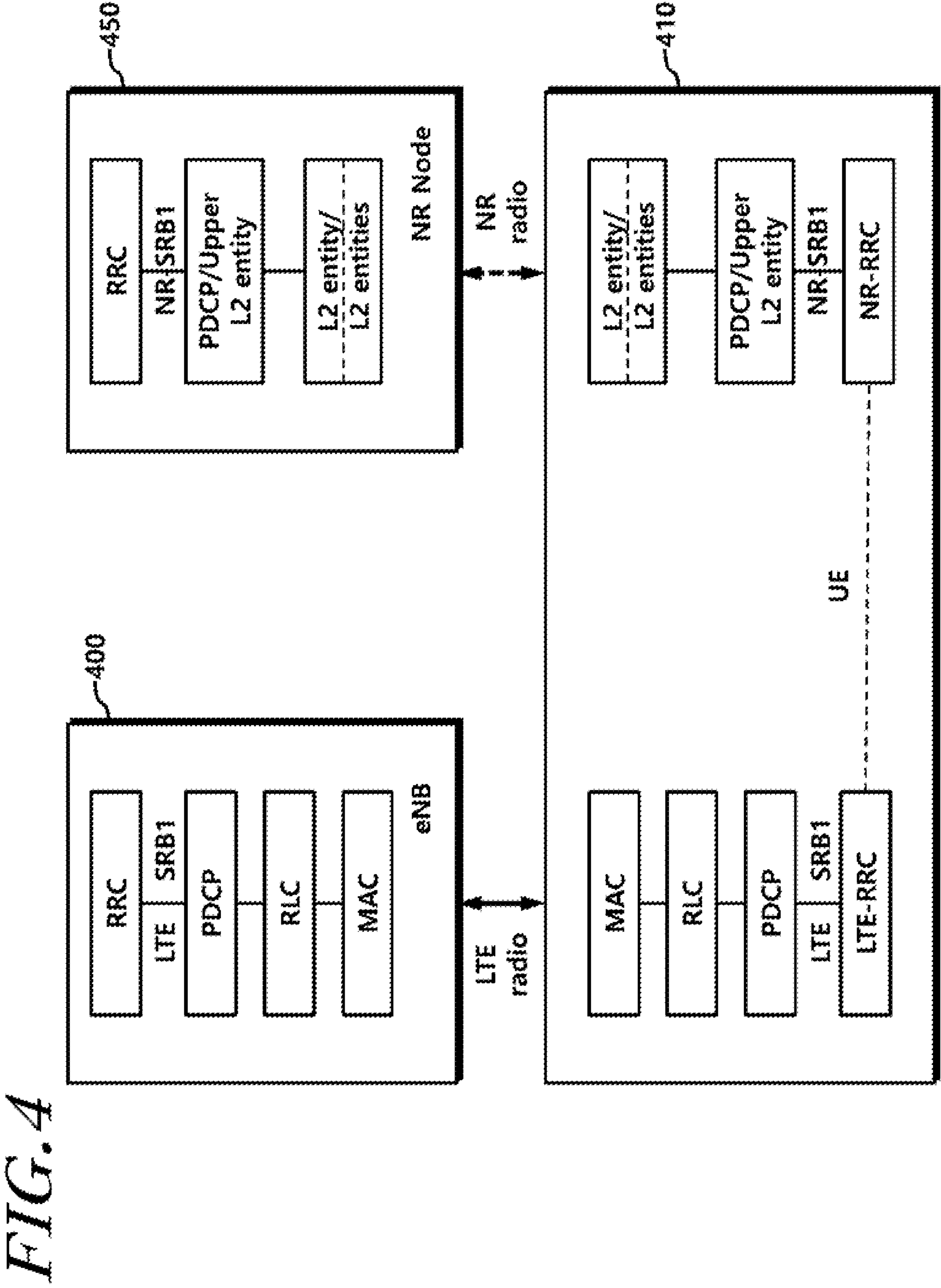
FIG. 4 is a diagram illustrating a dual connectivity SRB configuration according to an embodiment.

FIG. 4 is a diagram illustrating a dual connectivity SRB configuration according to an embodiment.

For example, an L2 entity of NR 450 of FIG. 4 is configured as one or two entities by reallocating the functions of the LTE MAC entity and the RLC entity of LTE 400. For convenience of description and ease of understanding, FIG. 4 illustrates that an LTE-RRC entity and an NR-RRC entity are independently configured in a UE 410. However, the embodiments of the present disclosure are not limited thereto. For example, a single RRC entity/layer may be configured in the UE 410 in accordance with anther embodiment of the present disclosure.

When a single RRC entity/layer is configured in the UE 410, data may be transmitted via NR-SRB1 in association with an RRC message received from an NR BS 450 and a response RRC message corresponding thereto. When two RRC entities are configured in the UE 410, data may be transmitted via NR-SRB1 in association with an RRC message received from the NR BS 450 or a response RRC message corresponding thereto. The NR BS 450 may preferentially process NR-SRB1 than a DRB. For example, a predetermined logical channel identification information (logicalchannelIdentity) value may be designated for NR-SRB1. As another example, a logical channel identification information (logicalchannelIdentity) value (e.g., 1), which is the same as that of SRB1, may be designated for NR-splitSRB1. As another example, an SRB identification information (SRB-identity) value (e.g., 1), which is the same as that of SRB1, may be designated for NR-SRB1. As another example, a logical channel configuration value (e.g., priority (1 or 2), prioritisedBitRate(infinite)) which is the same as/similar to that of SRB1 is designated for NR-SRB1. As another example, information may be included that enables a UE to identify SCG SRB1 although logical channel identification information that is the same as that of SRB1 is included.

As another example, although logical channel identification information which is different from that of SRB1 is included, logical channel configuration information which is the same as that of SRB1 may be included.

The NR BS 450 may transmit, to the UE 410, an NR RRC message including one or more pieces of control information from among information for adding/modifying/releasing/managing an NR cell/cell group/transmission point/transmission point group/transmission and reception point/transmission and reception point group/TRP/antenna/antenna group/beam, NR measurement information, NR measurement reporting information, NR resource allocation information, NR radio bearer adding/modifying/releasing information, NR radio resource configuration information, and NR mobility control information. In association with a downlink RRC message, the NR BS 450 (an RRC entity of the NR BS) may transfer an NR RRC container/NR RRC IEs/NR RRC message including NR RRC IEs to the UE 410 via NR-SRB1.

When the UE receives the NR RRC message via NR-SRB1 (e.g., an RRC connection reconfiguration message), the UE may apply a new configuration by using the following methods independently or in combination. The NR RRC message may include radio resource configuration information associated with the NR BS. For example, as described above, in the case of dual connectivity, the NR RRC message may include secondary BS (NR BS) radio resource configuration information.

2-1) Method of Applying New Configuration via One RRC Entity in UE

A UE may configure an NR radio resource via an RRC entity.

When an MeNB transmits an RRC message including a new radio resource configuration of an SCG to a UE in the legacy LTE dual connectivity and when the UE is incapable of complying with (a part of) the configuration included in a RRC connection reconfiguration message, the UE performs a reconfiguration failure procedure.

The reconfiguration failure procedure in LTE is performed as follows.

When the UE is incapable of complying with (a part of) the configuration included in the RRC connection reconfiguration message, the UE may continuously use the configuration which was used before the reception of the RRC connection reconfiguration message. When security is not activated, the cause of release is set to "other" and an operation of leaving an "RRC_CONNECTED" state may be performed. Otherwise, the UE may initiate a connection re-establishment procedure.

As described above, the reconfiguration failure in the legacy LTE may cause interruption of a service since the UE needs to be switched to an idle mode or an RRC connection reconfiguration procedure needs to be performed.

There is a possibility that an NR radio resource configuration process fails due to various causes associated with the features of NR. Therefore, when a failure occurs in the NR radio resource configuration process due to any reason, switching the UE into the idle mode or performing the RRC connection reconfiguration procedure may be inefficient.

As an example to overcome such defects, when the UE fails to implement NR configuration included in the NR RRC message (or the UE is incapable of complying with the NR configuration included in the NR RRC message for any reason), the UE may not trigger a reconfiguration failure procedure. That is, the UE may prevent NR RRC configuration failure from triggering LTE RRC configuration failure. For example, when NR RRC configuration fails, the UE may transmit an RRC message including the cause of NR RRC configuration failure (e.g., an SCG failure information message, a UE assistance message, or an NR failure information/NR status message to be newly defined) to an NR BS. As another example, when NR RRC configuration fails, the UE may transmit an RRC message including the cause of NR RRC configuration failure (e.g., an SCG failure information message, a UE assistance message, or an NR failure information/NR status message to be newly defined) to an LTE BS. That is, when the UE fails to configure radio resources of a secondary BS using an RRC message received via an SRB of the secondary BS, the UE may transmit corresponding failure information to a master BS.

Hereinafter, the above-described method will be described in detail.

The received RRC message may include configuration information for configuring an NR radio resource (e.g., one or more piece of information from among NR cell configuration information, NR bearer configuration information, control information for NR random access, NR measurement configuration information, NR mobility control information, and NR radio resource-dedicated configuration information). Hereinafter, for ease of description, configuration information for adding or modifying an NR BS in dual connectivity or information for reconfiguring NR radio resources via a secondary BS SRB may be described as secondary BS radio resource configuration information, NR radio resource configuration information, NR configuration information, or configuration information.

For example, an RRCConnectionReconfiguration message that is received via a master BS SRB includes NR radio resource configuration information, the UE (e.g., a UE RRC entity) may perform NR configuration.

As another example, an RRCConnectionReconfiguration message that is received via a secondary BS SRB includes NR radio resource configuration information, the UE (e.g., a UE RRC entity) may perform NR configuration.

When the UE is incapable of complying with the NR configuration in each example, the UE may continuously use the (NR) configuration that was used before the reception of the RRC connection reconfiguration message (before the reception of NR configuration information).

Alternatively, when the UE (RRC) is incapable of complying with the NR configuration, the UE may suspend/interrupt/stop/release the use of NR radio resources. The NR radio resources may include at least one from among a secondary cell group data radio bearer (DRB), a secondary cell group SRB, a secondary cell group part of a split DRB, and a secondary cell group part of a split SRB.

Alternatively, when the UE (RRC) is incapable of complying with the NR configuration, the RRC may transmit an RRC message including the cause of NR RRC configuration failure to an LTE BS. The LTE BS may transfer the same to the NR BS.

Alternatively, when the UE (RRC) is incapable of complying with the NR configuration, the RRC may directly transmit an RRC message including the cause of NR RRC configuration failure to the NR BS via the interface between the UE and the NR BS.

2-2) Method of Applying New Configuration via Two RRC Entities in UE

As described above, NR may independently include evolvable features, which are different from those of LTE. In order to effectively implement the same, a UE may configure an LTE RRC and an NR RRC.

When an MeNB transmits an RRC message including a new radio resource configuration of an SCG to a UE in the legacy LTE dual connectivity and when the UE is incapable of complying with (a part of) the configuration included in a RRC connection reconfiguration message, the UE performs a reconfiguration failure procedure. The reconfiguration failure procedure in LTE is performed as follows.

When the UE is incapable of complying with (a part of) the configuration included in the RRC connection reconfiguration message, the UE may continuously use the configuration which was used before the reception of the RRC connection reconfiguration message. When security is not activated, the cause of release is set to "other" and an operation of leaving an "RRC_CONNECTED" state may be performed. Otherwise, the UE may initiate a connection re-establishment procedure.

As described above, the reconfiguration failure in the legacy LTE may cause interruption of a service since the UE needs to be switched to an idle mode or an RRC connection reconfiguration procedure needs to be performed.

There is a possibility that an NR addition process fails due to various causes associated with the features of NR. Therefore, when a failure occurs in the NR addition process due to any reason, switching the UE into the idle mode or performing the RRC connection reconfiguration procedure may be inefficient.

As an example to overcome such defects, when the UE fails to implement the NR configuration included in the NR RRC message (or is incapable of complying with the NR configuration included in the NR RRC message for any reason), the UE may not trigger a reconfiguration failure procedure. The UE may prevent NR RRC configuration failure from triggering LTE RRC configuration failure. When NR RRC configuration fails, the UE may transmit an RRC message including the cause of NR RRC configuration failure (e.g., an SCG failure information message, a UE assistance message, or an NR failure information/NR status message to be newly defined) to an NR BS (or an LTE BS). Alternatively, when the UE (RRC) is incapable of complying with the NR configuration, the RRC may transmit an RRC message including the cause of NR RRC configuration failure to the LTE BS. The LTE BS may transfer the same to the NR BS.

Hereinafter, the above-described method will be described in detail.

When a received RRCConnectionReconfiguration message includes configuration information for configuring NR radio resources, the UE (NR RRC) may perform NR configuration.

Alternatively, when the UE(NR RRC) is incapable of complying with the NR configuration, the UE may continuously use the (NR) configuration that was used before the reception of RRC connection reconfiguration message (before the NR RRC receives NR configuration information).

Alternatively, when the UE (NR RRC) is incapable of complying with the NR configuration, the UE may suspend/interrupt/stop/release the use of NR radio resources. The NR radio resources may include at least one from among a secondary cell group data radio bearer (DRB), a secondary cell group SRB, a secondary cell group part of a split DRB, and a secondary cell group part of a split SRB.

Alternatively, when the UE (NR RRC) is incapable of complying with the NR configuration, the UE may release NR radio resources.

Alternatively, when the UE (NR RRC) is incapable of complying with the NR configuration, the NR RRC may indicate NR reconfiguration failure to an LTE RRC. The LTE RRC may transfer an RRC message including the cause of NR RRC configuration failure to the LTE BS. The LTE BS may transfer the same to the NR BS.

Alternatively, when the UE (NR RRC) is incapable of complying with the NR configuration, the NR RRC may directly transmit an RRC message including the cause of NR RRC configuration failure to the NR BS via the interface between the UE and the NR BS.

Hereinafter, another example of NR radio link failure will be described.

When a radio link problem (failure) is detected from an NR physical layer, the UE may indicate NR physical layer failure to an RRC entity. The RRC entity may indicate an RRC message including the cause of NR physical layer failure to an LTE BS via an LTE SRB.

3. Configure SRB by NR BS and LTE BS

NR may include wireless communication features different from the features of LTE, and an LTE BS may not understand an RRC message generated by an NR BS.

The NR BS may directly transmit, to a UE, an NR RRC message including one or more pieces of control information from among information for adding/modifying/releasing/managing an NR cell/cell group/transmission point/transmission point group/transmission and reception point/transmission and reception point group/TRP/antenna/antenna group/beam, NR measurement information, NR measurement reporting information, NR resource allocation information, NR radio bearer adding/modifying/releasing information, NR radio resource configuration information; and NR mobility control information.

However, NR may be established even in a high-frequency band (e.g., a 6 GHz or more high-frequency band). In this instance, due to the link blockage of the high-frequency band and high transmission loss, quick SINR drops may occur. Also, a problem may occur when an NR RRC is transmitted. In order to overcome the drawback, an NR RRC message may be transmitted using both the interface between the NR BS and the UE and the interface between the LTE BS and the UE.

Figure 5:
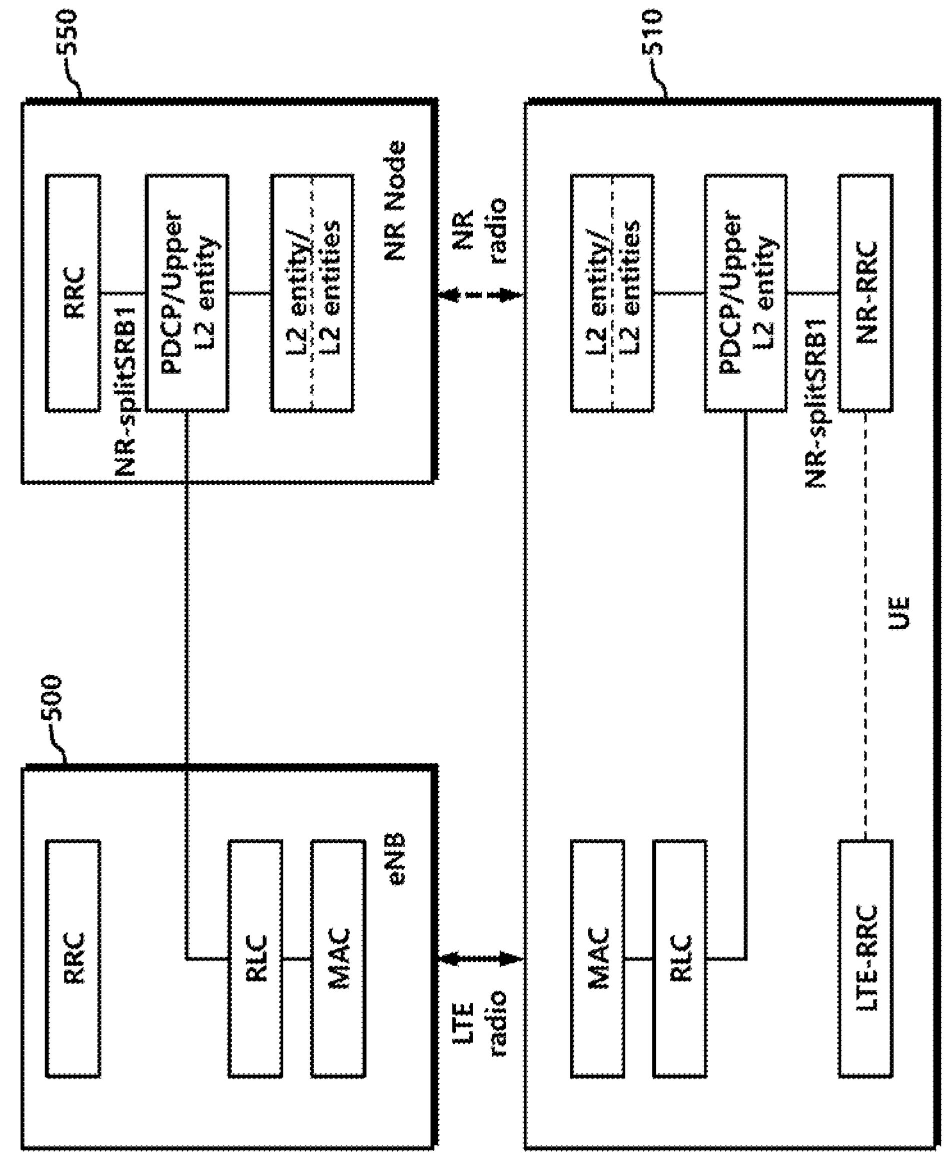
FIG. 5 is a diagram illustrating a dual connectivity SRB configuration according to another embodiment.

FIG. 5 is a diagram illustrating a dual connectivity SRB configuration according to another embodiment.

Referring to FIG. 5, for example, when LTE-NR dual connectivity is configured for a UE 510 (or when NR additional radio resources are configured), an NR BS 550 may configure an SRB (e.g., SRB1 type) which enables the UE 510 to use both an LTE BS 500 and the NR BS 550. Setup of the SRB (for ease of description, a signaling radio bearer configured, by an NR BS, to use both an LTE BS and the NR BS is described as NR-splitSRB1) that is capable of using both the LTE BS 500 and the NR BS 550 may be configured via an RRC reconfiguration message that (re) configures LTE-NR dual connectivity (that configures NR additional radio resources).

When security is activated, all RRC messages on NR-splitSRB1 may need to be ciphered and integrity protected by a PDCP (or an L2 entity on NR). It may be understood that the LTE-NR dual connectivity is applied to the RRC connected UE 510. Therefore, all RRC messages on NR-splitSRB1 may need to be ciphered and integrity protected by the PDCP (or (upper) L2 entity on NR).

To this end, security needs to be always activated for NR-splitSRB1 from the beginning. The NR BS 550 needs to avoid configuring the bearer before security is activated. The LTE BS 500 needs to avoid requesting addition of the NR BS 550 before security is activated. Alternatively, the NR BS 550 needs to avoid requesting addition of NRsplitSRB1 from the LTE BS 500 before security is activated. The NR BS 550 may configure NR-splitSRB1 according to a request for NR BS addition from the LTE BS 500. Alternatively, the NR BS 550 may configure NR-splitSRB1 as needed.

For example, when requesting NR BS addition, the LTE BS 500 needs to transfer (or calculate and transfer) an NR BS key (e.g., NR-KBS) to the NR BS 550. The NR BS 550 may select an integrity protection algorithm and a ciphering algorithm. The selected integrity protection algorithm and ciphering algorithm (or identification information of the integrity protection algorithm and the ciphering algorithm) by which NR-splitSRB1 is to be serviced to the UE 510, may be transferred to the UE 510 via the LTE BS 500. The LTE BS 500 (or the NR BS 550) may indicate a counter (an SCG counter or an NR counter) to be used when the UE 510 calculates a key value associated with NR-splitSRB1. The UE 510 may calculate the NR BS key. The UE 510 may calculate the key value (NR-$K_{RRCint}$, NR-$K_{RRCenc}$) associated with NR-SRB1. The UE 510 may perform configuration for enabling a lower layer (a PDCP or an L2 entity on NR) to apply the integrity protection algorithm, ciphering algorithm, NR-$K_{RRCint}$, and NR-$K_{RRCenc}$.

As another example, the NR BS 550 may inform the LTE BS 500 of information for configuring NR-splitSRB1. As described above, the LTE BS 500 may not understand an NR RRC container/NR RRC IEs of the NR BS 550. Therefore, the NR BS 550 may include information for directing the LTE BS 500 to configure NR-splitSRB1 in a signaling message on the interface between the NR BS 550 and the LTE BS 500. When information for directing the LTE BS 500 to configure NR-splitSRB1 is received, the LTE BS 500 may inform the UE 510 of information for configuring NR-splitSRB1. The LTE BS 500 may direct the UE 510 to preferentially process NR-splitSRB1 than a DRB. For example, a predetermined logical channel identification information (logicalchannelIdentity) value may be designated for NR-splitSRB1. The UE 510 may preferentially process a logical channel designated for NR-splitSRB1, than a DRB. As another example, a logical channel identification information (logicalchannelIdentity) value (e.g., 1), which is the same as that of SRB1, may be designated for NR-splitSRB1. As another example, information may be indicated such that NR-splitSRB1 is to be processed with the same priority as that of SRB1. As another example, information indicating that NR-splitSRB1 is a signaling bearer may be indicated. As another example, information may be indicated such that NR-splitSRB1 is to be processed with the same priority as that of SRB1 although a logical channel identification information (logicalchannelIdentity) value which is different from that of SRB1 is designated for NR-splitSRB1. For example, logical channel configuration information which is the same as that of SRB1 may be included. As another example, a SRB identification information (SRB-identity) value (e.g., 1), which is the same as that of SRB1, may be designated for NR-splitSRB1. As another example, a logical channel configuration value (e.g., priority (1 or 2), prioritisedBitRate(infinite)) which is the same as/similar to that of SRB1 is designated for NR-splitSRB1. As another example, information may be included that enables a UE to identify an entity for NR-split SRB1 although logical channel identification information that is the same as that of SRB1 is included.

As another example, although logical channel identification information which is different from that of SRB1 is included, logical channel configuration information which is the same as that of SRB1 may be included.

4. Configure SRB by LTE BS and NR BS

NR may include wireless communication features different from the features of LTE, and an LTE BS may not understand an RRC message generated by an NR BS.

The NR BS may directly transmit, to a UE, an NR RRC message including one or more pieces of control information from among information for adding/modifying/releasing/managing an NR cell/cell group/transmission point/transmission point group/transmission and reception point/transmission and reception point group/TRP/antenna/antenna group/beam, NR measurement information, NR measurement reporting information, NR resource allocation information, NR radio bearer adding/modifying/releasing information, NR radio resource configuration information, and NR mobility control information.

However, NR may be established even in a high-frequency band (e.g., a 6 GHz or more high-frequency band). In this instance, due to the link blockage of the high-frequency band and high transmission loss, quick SINR drops may occur, and a problem may be caused when an NR RRC is transmitted. In order to overcome the drawback, an NR RRC message may be transmitted using both the interface between the NR BS and the UE and the interface between the LTE BS and the UE.

However, it is preferable to preferentially transfer some uplink or downlink RRC Messages via the LTE BS for reliability.

Figure 6:
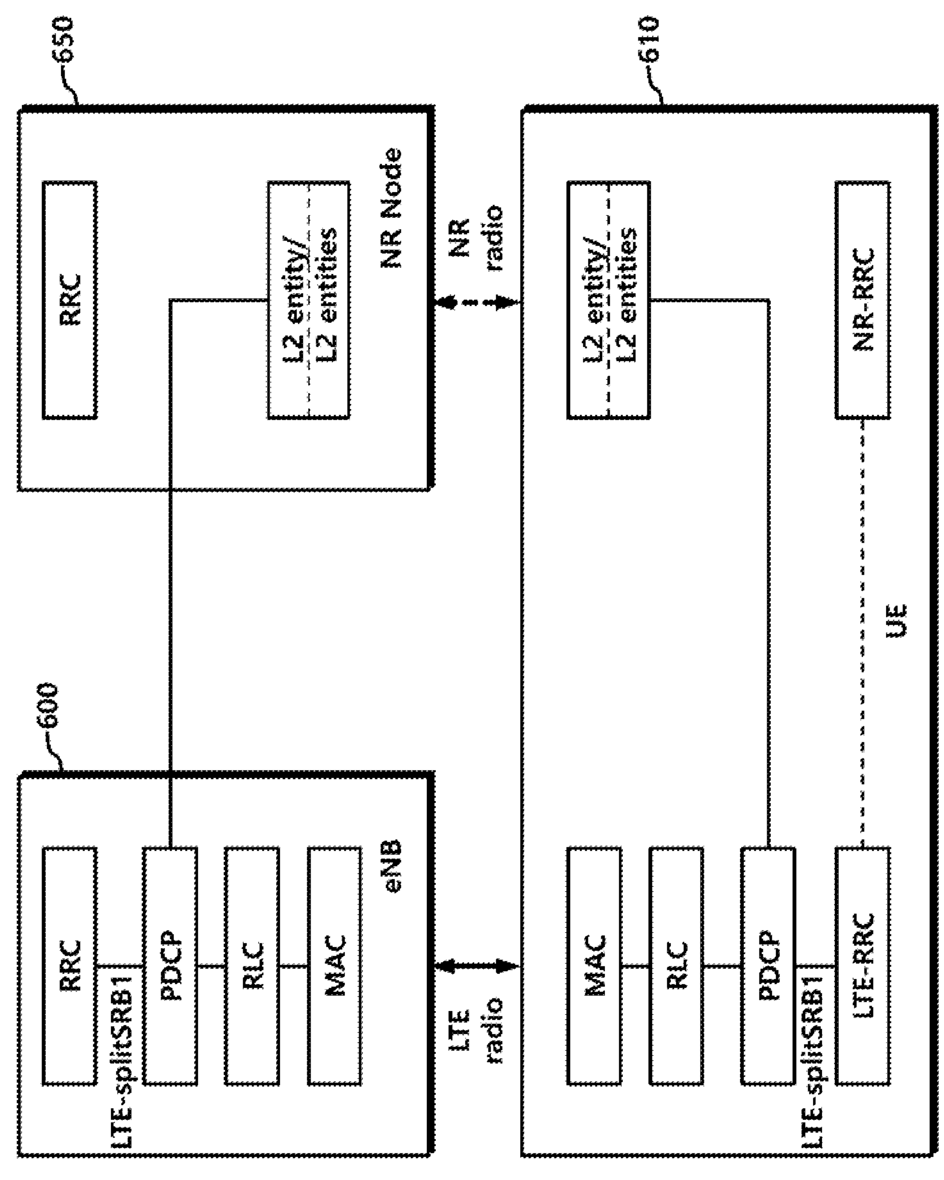
FIG. 6 is a diagram illustrating a dual connectivity SRB configuration according to another embodiment.

FIG. 6 is a diagram illustrating a dual connectivity SRB configuration according to still another embodiment.

Referring to FIG. 6, for example, when LTE-NR dual connectivity is configured for a UE 610 (or when NR additional radio resources are configured), an LTE BS 600 may configure an SRB (e.g., SRB1 type) which enables the UE 610 to use both the LTE BS 600 and an NR BS 650. Setup of the SRB (for ease of description, a signaling radio bearer configured, by an LTE BS, to use both the LTE BS and an NR BS is described as LTE-splitSRB1) that is capable of using both the LTE BS 600 and the NR BS 650 may be configured via an RRC reconfiguration message that (re)configures LTE-NR dual connectivity (that configures NR additional radio resources).

All RRC messages on LTE-splitSRB1 may need to be ciphered and integrity protected by a PDCP.

To this end, security needs to be always activated for LTE-splitSRB1 from the beginning. The LTE BS 600 needs to avoid configuring the bearer before security is activated. The LTE BS 600 needs to avoid requesting addition of the NR BS 650 before security is activated. The NR BS 650 may set up NR configuration for LTE-splitSRB1 according to indication information included in an NR BS addition request from the LTE BS 600.

For example, when NR BS addition is requested, the LTE BS 600 may transfer information for indicating the configuration of LTE-splitSRB1 to the NR BS 650. The NR BS 650 may transfer information for configuring an NR part of LTE-splitSRB1 (e.g., one or more piece of information from among logaicalchannelconfig, logicalchannelIdentity, and rlcconfig) to the UE 610 via the LTE BS 600. As another example, the NR BS 650 may inform the LTE BS 600 of information for confirming LTE-splitSRB1. As described above, the LTE BS 600 may not understand an NR RRC container/NR RRC IEs of the NR BS 650. Therefore, the NR BS 650 may include the indication information for directing the LTE BS 600 to confirm LTE-splitSRB1 in a signaling message on the interface between the NR BS 650 and the LTE BS 600. When the LTE BS 600 receives information for indicating configuration of LTE-splitSRB1 is received, the LTE BS 600 may inform the UE 610 of information for configuring an LTE part of LTE-splitSRB1. The LTE BS 600 may preferentially process LTE-splitSRB1 than a DRB. For example, a predetermined logical channel identification information (logicalchannelIdentity) value may be designated for LTE-splitSRB1. The UE 610 may preferentially process a logical channel designated for LTE-splitSRB1, than a DRB. As another example, a logical channel identification information (logicalchannelIdentity) value (e.g., 1), which is the same as that of SRB1, may be designated for NR-splitSRB1 (or NR-splitSRB1 may be configured to be SRB1 or SRB2).

The NR BS 650 may preferentially process LTE-splitSRB1 than a DRB. For example, a predetermined logical channel identification information (logicalchannelIdentity) value may be designated for LTE-splitSRB1. The UE 610 may preferentially process a logical channel designated for LTE-splitSRB1, than a DRB. As another example, a logical channel identification information (logicalchannelIdentity) value (e.g., 1), which is the same as that of SRB1, may be designated for LTE-splitSRB1 (or LTE-splitSRB1 may be configured to be SRB1 or SRB2). As another example, information may be indicated such that LTE-splitSRB1 is to be processed with the same priority as that of SRB1. As another example, information indicating that LTE-splitSRB1 is a signaling bearer may be indicated. As another example, an SRB identification information (SRB-identityvalue (e.g., 1), which is the same as that of SRB1, may be designated for LTE-splitSRB1. As another example, a logical channel configuration value (e.g., priority (1 or 2), prioritisedBitRate(infinite)) which is the same as/similar to that of SRB1 is designated for LTE-splitSRB1. As another example, LTE-splitSRB1 may be processed like SRB1, and separate configuration may not be performed. As another example, information may be included that enables a UE to identify an entity for LTE-split SRB1 although logical channel identification information that is the same as that of SRB1 is included.

As another example, although logical channel identification information which is different from that of SRB1 is included, logical channel configuration information which is the same as that of SRB1 may be included.

In this instance, the LTE BS 600 may inform the UE of information for designating the path of an RRC signaling message at a PDCP entity, to LTE BS 600 and the NR BS 650 (or to LTE BS 600, the NR BS 650, and two BSs).

Hereinafter, a method of processing the RRC messages when a UE receives different RRC messages will be described in details.

According to the above-described embodiments, each of the LTE RRC entity of the LTE BS and the NR RRC entity of the NR BS may independently indicate a corresponding BS radio resource control configuration. Alternatively, according to the above-described embodiments, each of the LTE RRC entity of the LTE BS and the NR RRC entity of the NR BS may independently indicate a corresponding BS radio resource control configuration within the scope of UE capabilities. Alternatively, according to the above-described embodiments, the LTE RRC entity of the LTE BS and the NR RRC entity of the NR BS may indicate a corresponding BS radio resource control configuration via coordination. Alternatively, according to the above-described embodiments, the LTE RRC entity of the LTE BS may indicate an LTE BS radio resource control configuration via the LTE radio link and the NR radio link. Alternatively, according to the above-described embodiments, the NR RRC entity of the NR BS may indicate an LTE BS radio resource control configuration via an NR radio link and an LTE radio link.

The LTE BS may indicate, to a UE, an RRC message indicating (related to NR BS radio resource configuration or affecting NR BS radio resource configuration) the NR BS radio resource configuration. For example, the LTE BS may transmit, to the UE, an RRC message including information indicating release of NR BS radio resources (NR-configuration).

For example, when the RRC message that the UE receives from the LTE BS is set to release NR BS radio resources, the UE releases the entire NR BS radio resources excluding a DRB configuration. When the current UE configuration includes one or more split or SCG DRBs, and the received RRC reconfiguration message includes radio resource configuration-dedicated information including information associated with a DRB to be added or modified (drb-ToAddModList), the UE may reconfigure the split or SCG DRBs according to the information associated with a DRB to be added or modified.

As another example, when the RRC message that the UE receives from the LTE BS is set to release NR BS radio resources, the UE releases the entire NR BS radio resources.

When the LTE BS indicates an RRC message indicating NR BS radio resource configuration (related to NR BS radio resource configuration/affecting NR BS radio resource configuration) to the UE, the NR BS may indicate an RRC message indicating NR BS radio resource configuration to the UE.

For example, the NR BS may indicate, to the UE, the RRC message indicating one or more piece of NR radio resource configuration information from among NR cell addition (modification, release, or management), NR measurement, NR measurement reporting, NR resource allocation, NR radio bearer addition/modification/release, NR radio resource configuration, and NR mobility control.

For example, when the UE does not complete applying a received RRC message yet, the UE may receive another RRC message.

1. When NR Radio Resource Release is Received from LTE BS

When a UE configures NR BS radio resources according to an RRC message received from an NR BS and when the UE receives an RRC message including information indicating release of NR BS radio resources (NR-configuration) from an LTE BS, the UE may perform one or more operations from among the following operations:

The UE may release NR BS radio resources.

When release of NR BS radio resources is received from the LTE BS, the UE may interrupt/stop/cancel/defer/drop/pause/override the currently performed operation on the basis of the RRC message or change to the configuration that was used before the reception of the currently performed RRC message, and may release NR BS radio resources.

The UE may transmit, to the NR BS, an RRC message indicating that release of NR BS radio resources is received from the LTE BS and the UE interrupts/stops/cancels/defers/drops/pauses/overrides the currently performed operation on the basis of the RRC message or changes to the configuration that was used before the reception of the currently performed RRC message.

NR BS radio resources may be configured for the UE sequentially according to the order of reception of the RRC messages. Accordingly, the UE may complete operations for configuration according to the RRC message received earlier, and then may release NR BS radio resources.

When the RRC message that the UE receives from the LTE BS is set to release NR BS radio resources, the UE releases the entire NR BS radio resources excluding a DRB configuration.

When the current UE configuration includes one or more split or SCG DRBs, and the received RRC reconfiguration message includes radio resource configuration-dedicated information including information associated with a DRB to be added or modified (drb-ToAddModList), the UE may reconfigure the split or SCG DRBs according to the information associated with a DRB to be added or modified.

A BS (the LTE BS or the NR BS) may perform configuration by indicating, to the UE, information for indicating the above described operations.

2. When NR Radio Resource Release is Received from NR BS

When a UE configures NR BS radio resources according to an RRC message received from an LTE BS and when the UE receives an RRC message including information indicating release of NR BS radio resources (NR-configuration) from an NR BS, the UE may perform one or more operations from among the following operations:

The UE may release NR BS radio resources.

When release of NR BS radio resources is received from the NR BS, the UE may interrupt/stop/cancel/defer/drop/pause/override the currently performed operation on the basis of the RRC message or change to the configuration that was used before the reception of the currently performed RRC message, and may release NR BS radio resources.

The UE may transmit, to an LTE BS, an RRC message indicating that release of NR BS radio resources is received from the NR BS and the UE interrupts/stops/cancels/defers/drops/pauses/overrides the currently performed operation on the basis of the RRC message or changes to the configuration that was used before the reception of the currently performed RRC message.

NR BS radio resources may be configured for the UE sequentially according to the order of the reception of RRC messages. Accordingly, the UE may complete operations for configuration according to the RRC message received earlier, and then may release NR BS radio resources.

When the RRC message that the UE receives from the NR BS is set to release NR BS radio resources, the UE releases the entire NR BS radio resources excluding a DRB configuration.

When the current UE configuration includes one or more split or SCG DRBs, and the received RRC reconfiguration message includes radio resource configuration-dedicated information including information associated with a DRB to be added or modified (drb-ToAddModList), the UE may reconfigure the split or SCG DRBs according to the information associated with a DRB to be added or modified.

An BS (the LTE BS or the NR BS) may perform configuration by indicating, to the UE, information for indicating the above described operations.

3. When Different RRC Messages are Received, Excluding Release of NR Radio Resources When a UE configures NR BS radio resources according to an RRC message received from an LTE BS and when the UE receives an RRC message including information indicating addition/modification/configuration of NR BS radio resources (NR-configuration) from an NR BS, the UE may perform one or more operations from among the following operations (alternatively, in the case in which the UE configures NR BS radio resources according to an RRC message received from an NR BS, when the UE receives an RRC message including information indicating addition/modification/configuration of NR BS radio resources (NR-configuration) from the LTE BS, the UE may perform one or more operations from among the following operations):

NR BS radio resources may be configured for the UE sequentially according to the order of reception of RRC messages. Accordingly, the UE may complete operations for configuration according to the RRC message received earlier and then may configure NR BS radio resources according to the RRC message received subsequently.

An RRC message received from a master BS (e.g., the LTE BS) may be preferentially processed. The UE may transmit, to a secondary BS (e.g., the NR BS), an RRC message including information indicating that RRC configuration indication is interrupted/stop/cancelled/deferred/dropped/overridden or the configuration is changed to the configuration that was used before reception of the RRC message.

An RRC message received from the NR BS may be preferentially performed.—The UE may transmit, to the NR BS, an RRC message including information indicating that RRC configuration indication is interrupted/stop/cancelled/deferred/dropped/overridden or the configuration is changed to the configuration that was used before reception of the RRC message.

A BS (the LTE BS or the NR BS) may perform configuration by indicating, to the UE, information for indicating the above described operations.

According to the present disclosure described above, radio resource control signaling of the NR BS for LTE-NR dual connectivity operation that supports tight interworking between LTE and NR may be effectively processed. Also, a BS may distinctively process RRC messages using two different radio access links.

Hereinafter, a UE and a BS that may perform some or all of the present embodiments which have been described with reference to FIGS. 1 to 6 will be described with reference to drawings.

Figure 7:
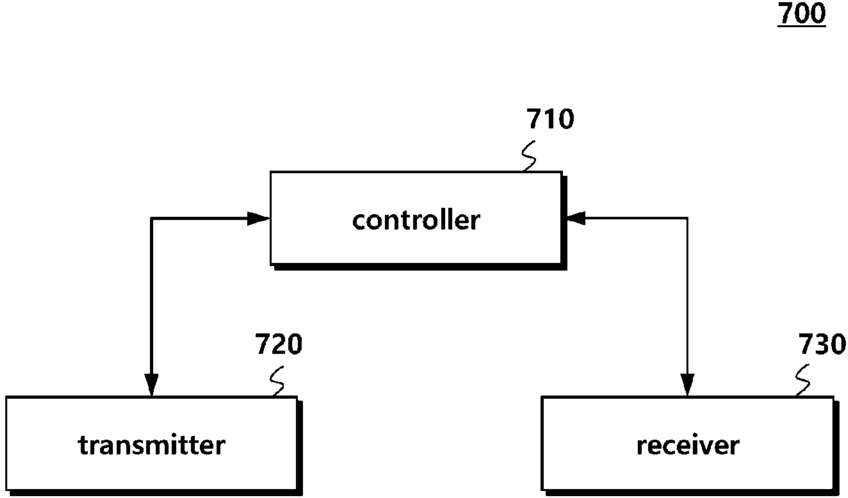
FIG. 7 is a diagram illustrating a user equipment according to an embodiment.

FIG. 7 is a diagram illustrating a UE according to an embodiment.

Referring to FIG. 7, a UE 700 that configures dual connectivity and transmits and receives data may include a receiver 730 that receives, from a master BS, an RRC message indicating configuration of dual connectivity using the master BS and a secondary BS.

For example, the RRC message may include configuration information for enabling the UE to configure dual connectivity using the master BS and the secondary BS which employ different access technologies. The configuration information may include cell information, cell group information, RRC connection information, and the like associated with the master BS and the secondary BS.

As another example, the RRC message may include information indicating duplicated transmission of uplink data using a split signaling radio bearer at a packet data convergence protocol (PDCP) entity of a UE. Alternatively, the RRC message may include information configuring the data transmission path of a split signaling radio bearer.

Also, the UE 700 may include a controller 710 that configures a split signaling radio bearer (split SRB) connected to two cells or cell groups, in order to configure dual connectivity.

For example, the controller 710 may configure a split signaling radio bearer connected to a cell associated with the master BS and to a cell associated with the secondary BS.

As another example, the controller 710 may configure a split signaling radio bearer connected to a master cell group including one or more cells associated with the master BS and to a secondary cell group including one or more cells associated with the secondary BS.

The split signaling radio bearer may be configured via links of the master BS and the secondary BS to the UE and may be different from a bearer connected only via the master BS and a bearer connected only via the secondary BS. Also, the split signaling radio bearer may be configured by being split from the PDCP entity of the master BS or the PDCP entity of the secondary BS.

Also, the UE 700 may include a transmitter 720 that performs duplicated transmission of uplink data to each of the master BS and the secondary BS via the split signaling radio bearer.

For example, when information for indicating duplicated transmission or the path of uplink data is set to duplicated transmission and is received, the packet data convergence protocol (PDCP) entity of the UE may transfer a PDCP protocol data unit (PDCP PDU) generated by duplicating a PDCP service data unit (PDCP SDU) including the uplink data, to radio link control (RLC) entities configured to be connected to the master BS and the secondary BS, respectively. That is, the UE may include an RLC entity configured to peer with the master BS and an RLC entity configured to peer with the secondary BS. It is the case in which duplicated transmission of the uplink data is set, the UE may transfer a PDCP PDU of the same data to two RLC entities, at the PDCP entity. Each RLC entity may transfer the uplink data to the RLC entity of each of the master BS and the secondary BS. That is, the same uplink data may be duplicately transmitted via a master BS link and a secondary BS link.

As another example, when information for indicating duplicated transmission or the path of uplink data is set to a master cell group or secondary cell group transmission path, the packet data convergence protocol (PDCP) entity of the UE may transfer a PDCP service data unit (PDCP SDU) including the uplink data to a radio link control (RLC) entity configured to be connected to the master cell group or the secondary cell group.

Similar to the transmission of uplink data by UE, the receiver 730 of the UE 700 may duplicately receive downlink data via the master BS and the secondary BS. In this instance, the packet data convergence protocol (PDCP) of the UE may discard any one of the downlink data duplicately received from the master BS and the secondary BS via a split signaling radio bearer. For example, the PDCP entity of the UE may discard any one of the data having the same sequence number from among the duplicately received downlink data. Through the above, data transferred to the upper of the PDCP entity may be transferred without duplication.

The master BS and the secondary BS described in the above descriptions are BSs that use different radio access technologies. For example, the master BS is an LTE eNB and the secondary BS is an NR gNB.

In addition, the receiver 730 may receive, from a BS, downlink control information, downlink data, a message, via a corresponding channel. The transmitter 720 transmits, to a BS, uplink control information, uplink data, and a message, via a corresponding channel.

Figure 8:
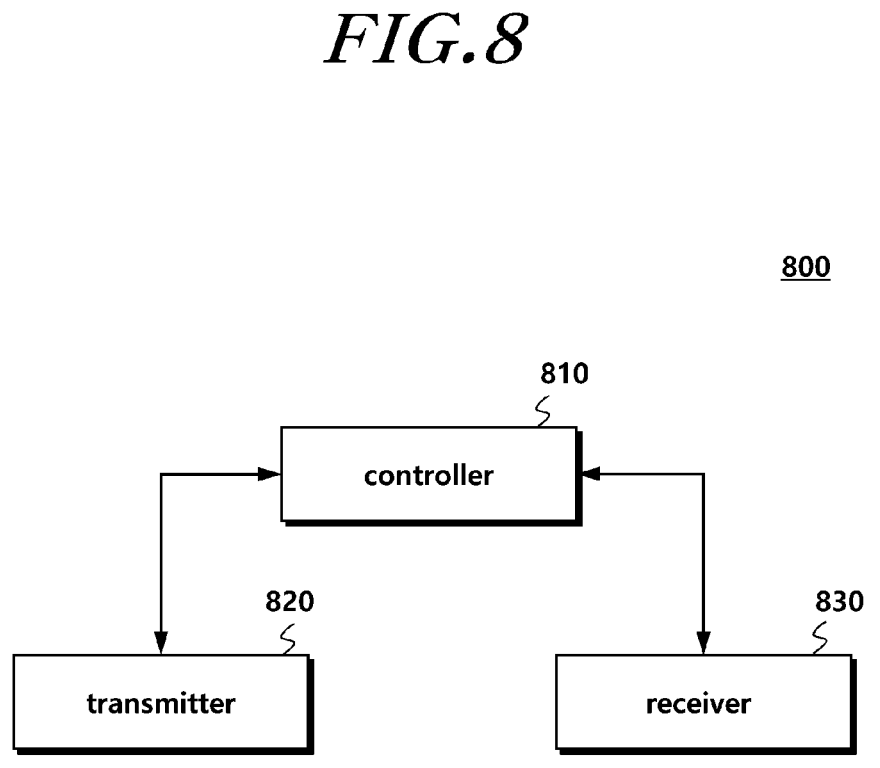

FIG. 8 is a diagram illustrating a BS according to an embodiment.

Referring to FIG. 8, a master BS 800 that transmits and receives data via dual connectivity may include a transmitter 820 that transmits an RRC message directing a UE to configure dual connectivity using the master BS and a secondary BS.

For example, the RRC message may include configuration information such that the UE configures dual connectivity using the master BS and the secondary BS which employ different access technologies. The configuration information may include cell information, cell group information, RRC connection information, and the like associated with the master BS and the secondary BS.

As another example, the RRC message may include information indicating duplicated transmission of uplink data using a split signaling radio bearer at a packet data convergence protocol (PDCP) entity of a UE. Alternatively, the RRC message may include information configuring the data transmission path of a split signaling radio bearer.

Also, the transmitter 820 may duplicately transmit downlink data to the UE via the split signaling radio bearer at a packet data convergence protocol (PDCP) entity of the master BS.

For example, the PDCP entity of the master BS may transfer a PDCP protocol data unit (PDCP PDU) generated by duplicating a PDCP service data unit (PDCP SDU) including downlink data to an RLC entity of the master BS and an RLC entity of the secondary BS. For example, when the information for indicating duplicated transmission or the path of downlink data is set to duplicated transmission, the master BS may transmit the same downlink data to the RLC entities of the master BS and the secondary BS, thereby performing duplicated transmission to the UE.

As another example, when information for indicating duplicated transmission or the path of downlink data is set to a master cell group or secondary cell group transmission path, the packet data convergence protocol (PDCP) entity of the master BS may transfer a PDCP service data unit (PDCP SDU) including the downlink data to a radio link control (RLC) entity configured to be connected to the master cell group or the secondary cell group.

The PDCP entity of the master BS may discard any one of the uplink data duplicately received from the UE via a split signaling radio bearer. For example, the PDCP entity of the master BS may discard any one of the data having the same sequence number from among the duplicately received uplink data. Through the above, data transferred to the upper of the PDCP entity may be transferred without duplication.

Also, the master BS 800 may include a controller 810 that configures a split signaling radio bearer (split SRB) connected to the secondary BS, in order to configure dual connectivity.

For example, the controller 810 may configure a split signaling radio bearer connected to a cell associated with the master BS and to a cell associated with the secondary BS.

As another example, the controller 810 may configure a split signaling radio bearer connected to a master cell group including one or more cells associated with the master BS and to a secondary cell group including one or more cells associated with the secondary BS.

The split signaling radio bearer may be configured via links of the master BS and the secondary BS to the UE and may be different from a bearer connected only via the master BS and a bearer connected only via the secondary BS. Also, the split signaling radio bearer may be configured by being split from the PDCP entity of the master BS or the PDCP entity of the secondary BS.

Also, the transmitter 820 and the receiver 830 are used for transmitting/receiving, to/from the UE and the secondary BS, a signal, a message, and data needed for performing the aforementioned present disclosure.

The standard details or standard documents mentioned in the above embodiments are omitted for the simplicity of the description of the specification, and constitute a part of the present specification. Therefore, when a part of the contents of the standard details and the standard documents is added to the present specifications or is disclosed in the claims, it should be construed as falling within the scope of the present disclosure.

Although a preferred embodiment of the present disclosure has been described for illustrative purposes, those skilled in the art will appreciate that various modifications, additions and substitutions are possible, without departing from the scope and spirit of the disclosure as disclosed in the accompanying claims. Therefore, exemplary aspects of the present disclosure have not been described for limiting purposes. The scope of the present disclosure shall be construed on the basis of the accompanying claims in such a manner that all of the technical ideas included within the scope equivalent to the claims belong to the present disclosure.

The invention claimed is:

1. A method of transmitting and receiving data by a user equipment (UE), the UE comprising a new radio (NR) packet data convergence protocol (PDCP) entity, the method comprising:

receiving, by the UE, a first radio resource control (RRC) message comprising configuration information on uplink duplication for a signaling radio bearer (SRB); and transmitting, by the UE, a second RRC message in response to the first RRC message through the SRB, wherein the second RRC message is duplicated by the NR PDCP entity and not by a long term evolution (LTE) PDCP entity, wherein the SRB is a split SRB, wherein the second RRC message is a NR RRC message and is transmitted via the split SRB, to both an LTE BS configured as a master base station (BS) and to a NR BS configured as a secondary BS, wherein the UE is configured to communicate with the LTE BS via a first radio link and with the NR BS via a second radio link separate from the first radio link, wherein the NR RRC message is transferred from the UE to the LTE BS using the first radio link and is simultaneously transferred from the UE to the NR BS using the second radio link, wherein the LTE BS is configured to transmit a request for NR BS addition to the NR BS, the request including an NR BS key, wherein the NR BS configures the split SRB according to the request for NR BS addition received from the LTE BS, wherein the second RRC message is security protected by the NR PDCP entity and not by the LTE PDCP entity, the security comprising a ciphering and an integrity protection that are activated before the LTE BS transmits the request for NR BS addition to the NR BS, wherein the NR BS avoids configuring the split SRB before the security is activated, wherein the method further comprises discarding any one of downlink data that is duplicately received from the master BS and/or the secondary BS, and wherein, for an NR-splitSRB1 configuration, the discarding is performed by the NR PDCP entity, and not by any LTE PDCP entity for that bearer.

2. The method of claim 1, wherein the secondary BS comprises a Central Unit (CU) and a Distribute unit (DU).

3. The method of claim 1, wherein the NR PDCP entity transfers the duplicated second RRC message to a first radio link control (RLC) entity for the master BS and a second RLC entity for the secondary BS.

4. The method of claim 3, wherein the first RLC entity is associated with a master cell group, and the second RLC entity is associated with a secondary cell group.

5. The method of claim 1, wherein the LTE BS avoids requesting the NR BS addition before the security is activated.

6. The method of claim 5, wherein the NR BS is further configured to inform the LTE BS of information for configuring the split SRB, the information for configuring the split SRB being transmitted from the NR BS to the LTE BS after transmission of the NR RRC message via the split SRB, wherein the information for configuring the split SRB directs the LTE BS to configure the split SRB according to an NR-splitSRB1 configuration, and wherein the information for configuring the split SRB received by the LTE BS is transmitted from the LTE BS to the UE to direct the UE to preferentially process the NR-splitSRB1 configuration than a data radio bearer (DRB) carrying user plane data.

7. The method of claim 1, wherein the NR BS selects an integrity protection algorithm and a ciphering algorithm for the split SRB and causes identification information of the selected algorithms to be transferred to the UE via the LTE BS, and wherein the LTE BS or the NR BS indicates a secondary cell group (SCG) counter or an NR counter for use by the UE to derive an integrity key NR-$K_{RRCint}$ and an encryption key NR-$K_{RRCenc}$ applied by an NR PDCP entity for the split SRB.

8. A user equipment (UE) that transmits and receives data, the UE comprising a new radio (NR) packet data convergence protocol (PDCP) entity and further comprising:

a receiver configured to receive a first radio resource control (RRC) message comprising configuration information on uplink duplication for a signaling radio bearer (SRB); and a transmitter configured to transmit a second RRC message in response to the first RRC message through the SRB, wherein the second RRC message is duplicated by the NR PDCP entity and not by a long term evolution (LTE) PDCP entity, wherein the SRB is a split SRB, wherein the second RRC message is a NR RRC message and is transmitted via the split SRB, to both an LTE BS configured as a master base station (BS) and to a NR BS configured as a secondary BS, wherein the UE is configured to communicate with the LTE BS via a first radio link and with the NR BS via a second radio link separate from the first radio link, wherein the NR RRC message is transferred from the UE to the LTE BS using the first radio link and is simultaneously transferred from the UE to the NR BS using the second radio link, wherein the LTE BS is configured to transmit a request for NR BS addition to the NR BS, the request including an NR BS key, wherein the NR BS configures the split SRB according to the request for NR BS addition received from the LTE BS, wherein the second RRC message is security protected by the NR PDCP entity and not by the LTE PDCP entity, the security comprising a ciphering and an integrity protection that are activated before the LTE BS transmits the request for NR BS addition to the NR BS, wherein the NR BS avoids configuring the split SRB before the security is activated, and wherein, for an NR-splitSRB1 configuration, any one of downlink data that is duplicately received from the master BS and/or the secondary BS is discarded by the NR PDCP entity, and not by any LTE PDCP entity for that bearer.

9. The UE of claim 8, wherein the secondary BS comprises a Central Unit (CU) and a Distribute unit (DU).

10. The UE of claim 8, wherein the NR PDCP entity transfers the duplicated second RRC message to a first radio link control (RLC) entity for the master BS and a second RLC entity for the secondary BS.

11. The UE of claim 10, wherein the first RLC entity is associated with a master cell group, and the second RLC entity is associated with a secondary cell group.

12. The UE of claim 8, wherein the LTE BS avoids requesting the NR BS addition before the security is activated.

13. The UE of claim 12, wherein the NR BS is further configured to inform the LTE BS of information for configuring the split SRB, the information for configuring the split SRB being transmitted from the NR BS to the LTE BS after transmission of the NR RRC message via the split SRB, wherein the information for configuring the split SRB directs the LTE BS to configure the split SRB according to an NR-splitSRB1 configuration, and wherein the information for configuring the split SRB received by the LTE BS is transmitted from the LTE BS to the UE to direct the UE to preferentially process the NR-splitSRB1 configuration than a data radio bearer (DRB) carrying user plane data.

14. The UE of claim 8, wherein the NR BS selects an integrity protection algorithm and a ciphering algorithm for the split SRB and causes identification information of the selected algorithms to be transferred to the UE via the LTE BS, and wherein the LTE BS or the NR BS indicates a secondary cell group (SCG) counter or an NR counter for use by the UE to derive an integrity key NR-$K_{RRCint}$ and an encryption key NR-$K_{RRCenc}$ applied by an NR PDCP entity for the split SRB.

* * * * *